United States Patent
Rao et al.

(10) Patent No.: US 10,462,545 B2
(45) Date of Patent: Oct. 29, 2019

(54) VOICE ACTIVATED ELECTRONIC DEVICE

(71) Applicant: Amazon Technologies, Inc., Seattle, WA (US)

(72) Inventors: Anurupa Rao, Sunnyvale, CA (US); Joshua Lemons, Los Gatos, CA (US); Prachi Avinash Pant, San Mateo, CA (US); Amrinder Pal Singh Saini, Union City, CA (US); Sourabh Pawar, San Jose, CA (US); Miyuki Matsumoto, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/265,705

(22) Filed: Sep. 14, 2016

(65) Prior Publication Data
US 2018/0199123 A1     Jul. 12, 2018

Related U.S. Application Data
(60) Provisional application No. 62/367,631, filed on Jul. 27, 2016.

(51) Int. Cl.
*H04R 1/02* (2006.01)
*G10L 15/30* (2013.01)
(Continued)

(52) U.S. Cl.
CPC .............. *H04R 1/028* (2013.01); *G06F 3/041* (2013.01); *G10L 15/30* (2013.01); *H04R 1/02* (2013.01);
(Continued)

(58) Field of Classification Search
None
See application file for complete search history.

(56) References Cited

U.S. PATENT DOCUMENTS

| | | | |
|---|---|---|---|
| 7,072,179 B1 * | 7/2006 | Curran | G06F 1/16 |
| | | | 165/104.32 |
| 9,275,637 B1 | 3/2016 | Weidner et al. | |

(Continued)

FOREIGN PATENT DOCUMENTS

| | | |
|---|---|---|
| DE | 381921 | 12/1989 |
| WO | 2013016369 | 7/2013 |

OTHER PUBLICATIONS

Wiggers, Kyle. "The Nucleus Smart Intercom Lets the Kids Call Grandma With the Push of a Button." . digitaltrends, Aug. 4, 2016, https://www.digitaltrends.com/home/nucleus-smart-intercom-launch/.*

(Continued)

*Primary Examiner* — James K Mooney
(74) *Attorney, Agent, or Firm* — Eversheds Sutherland (US) LLP

(57) ABSTRACT

Voice activated electronic devices are described herein. In some embodiments, the voice activated electronic device may include a housing forming a cavity. An array of microphones, one or more speakers, and one or more cameras may be located within the cavity. Furthermore, the voice activated electronic device may include a display screen and a touch screen, which may both be coupled to the housing such that the housing is substantially enclosed. In some embodiments, the array of microphones is positioned about the housing such that audio input may be detectable from audio output by the speaker(s) while the speaker(s) are outputting audio. For instance, one or more vibration mitigators may be included to dampen vibrations that may affect a performance and functionality of the one or more components located within the cavity.

20 Claims, 17 Drawing Sheets

(51) Int. Cl.
*H04R 1/40* (2006.01)
*G06F 3/041* (2006.01)
*H04R 3/00* (2006.01)
*H04R 1/04* (2006.01)
*G10L 15/22* (2006.01)
*G10L 15/08* (2006.01)
*H04N 5/225* (2006.01)
*H04N 5/64* (2006.01)

(52) U.S. Cl.
CPC ............... *H04R 1/04* (2013.01); *H04R 1/406* (2013.01); *H04R 3/005* (2013.01); *G10L 15/08* (2013.01); *G10L 15/22* (2013.01); *G10L 2015/088* (2013.01); *H04N 5/225* (2013.01); *H04N 5/642* (2013.01); *H04R 2201/401* (2013.01); *H04R 2420/07* (2013.01); *H04R 2499/15* (2013.01)

(56) References Cited

U.S. PATENT DOCUMENTS

| | | | | |
|---|---|---|---|---|
| 2005/0195562 | A1* | 9/2005 | Itskov | G06F 1/1605 361/679.41 |
| 2006/0290893 | A1* | 12/2006 | Lim | G03B 21/16 353/57 |
| 2008/0292117 | A1* | 11/2008 | Guenther | H04R 1/2834 381/150 |
| 2015/0010186 | A1* | 1/2015 | Larsen | H04R 1/025 381/332 |
| 2015/0156548 | A1 | 6/2015 | Sanjiv et al. | |
| 2016/0179265 | A1* | 6/2016 | Zeng | G06F 1/3231 345/173 |
| 2016/0204640 | A1* | 7/2016 | Kwak | H02J 7/0091 455/573 |

OTHER PUBLICATIONS

"Nucleus Anywhere Intercom with Amazon Alexa." Amazon, Dec. 18, 2015, https://www.amazon.com/Nucleus-Anywhere-Intercom-Amazon-Alexa/dp/B019JSE7PC?th=1.*

"Zettaly Avy review—the Android music box you didn't know you needed." Android Authority, edited by Jonathan Feist, Aug. 4, 2015, www.androidauthority.com/zettaly-avy-android-music-box-631030/.*

Patel, Nilay. "Sony Dash Review." engadget, May 1, 2010, https://www.engadget.com/2010/05/01/sony-dash-review/.*

Kooser, Amanda. "Remember Chumby? Cute touchscreen gadget returns from the dead." cnet, Jul. 2, 2017, Remember Chumby? Cute touchscreen gadget returns from the dead.*

"Amazon Echo Teardown." Ifixit, Dec. 16, 2014, https://www.ifixit.com/Teardown/Amazon+Echo+Teardown/33953.*

"ReSpeaker—Add Voice Control Extension to Anything You Like." Kickstarter, https://www.kickstarter.com/projects/seeed/respeaker-an-open-modular-voice-interface-to-hack/description.*

Geddes, Huw. "Microphone arrays to unlock the potential of speech recognition." XMOS, Jul. 20, 2016, www.xmos.com/blog/huw/post/microphone-arrays-unlock-potential-speech-recognition.*

International Search Report and Written Opinion for PCT Application No. PCT/US2017/043970, dated Dec. 7, 2017, 25 pages.

* cited by examiner

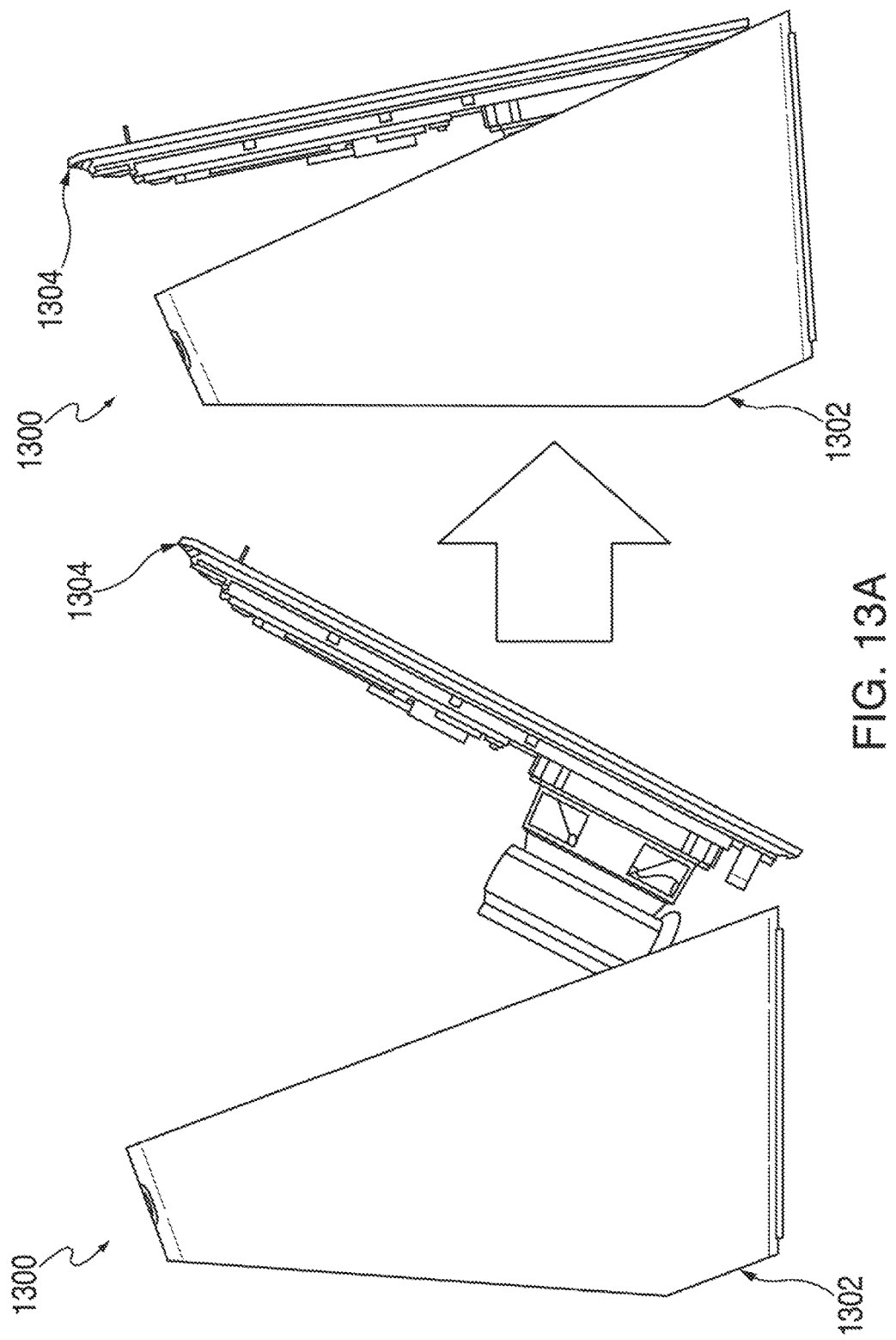

VOICE ACTIVATED ELECTRONIC DEVICE

CROSS REFERENCE TO RELATED APPLICATIONS

This application claims the benefit of U.S. Provisional Patent Application No. 62/367,631, which was filed on Jul. 27, 2016, the disclosure of which is incorporated herein by reference in its entirety.

BACKGROUND

Voice activated electronic devices may output sound using one or more speakers. Amplification of sound by such speakers may, however, create performance problems for microphones, cameras, display screens, and touch screens due to vibrations.

BRIEF DESCRIPTION OF THE DRAWINGS

The above and other features of the present invention, its nature and various advantages will be more apparent upon consideration of the following detailed description, taken in conjunction with the accompanying drawings in which:

FIG. 13A is an illustrative schematic of a side view of a voice activated electronic device in accordance with various embodiments;

DETAILED DESCRIPTION

The present disclosure, as set forth below, is generally directed to various embodiments of a voice activated device having a speaker, a housing, a touch sensitive display unit, one or more speakers, and one more microphones. In a non-limiting embodiment, a voice activated electronic device may include a housing with an internal cavity, a touch sensitive display unit, and control circuitry mechanically coupled to the housing. Within the internal cavity, the voice activated electronic device may include an image capturing device, a speaker, and an array of microphones. The image capturing device, which may be partially exposed, may have a lens that captures images. In some embodiments, the lens may be covered by a transparent cover. The image capturing device, speaker and array of microphones may all be mechanically coupled to the housing. When the at least one speaker is operational, the housing is used to, among other functions, assist in the production of the sound output by the speaker. The array of microphones are positioned a distance away from the at least one speaker such that when the speaker is outputting sound, the array of microphones can still receive audio. In some embodiments, the voice activated electronic device may have an additional speaker. In some embodiments, the speaker and additional speaker may not have individual sealed speaker boxes. In some embodiments, the speaker and additional speaker may utilize the internal cavity within the housing to produce sound output by the speaker and additional speaker. In some embodiments, the touch sensitive display unit may be operable to display content. In some embodiments, the touch sensitive display unit may be operable to receive touch inputs.

As employed herein, the term "mechanically coupled" shall mean that two or more parts are joined together directly or joined through one or more intermediate parts. This may include, but is not limited to using a screw or an adhesive. Screws, in some embodiments may include a fastening material (i.e. a Nylok Patch) to ensure vibrations do not affect their performance. As employed herein, the statement that two or more parts are "electrically coupled" or are in "electrical communication" shall mean that two or more the parts or components are joined together either directly or joined through one or more intermediate parts such that electricity, current, voltage, and/or energy is operable to flow from one part or component to the other part or component, and vice versa. Further still, as employed herein, the term "thermally coupled" or "thermally connected" or "thermally attached" shall mean that two or more parts are joined together directly or through one or more intermediate parts such that heat may flow between the two or more parts.

Figure 1:
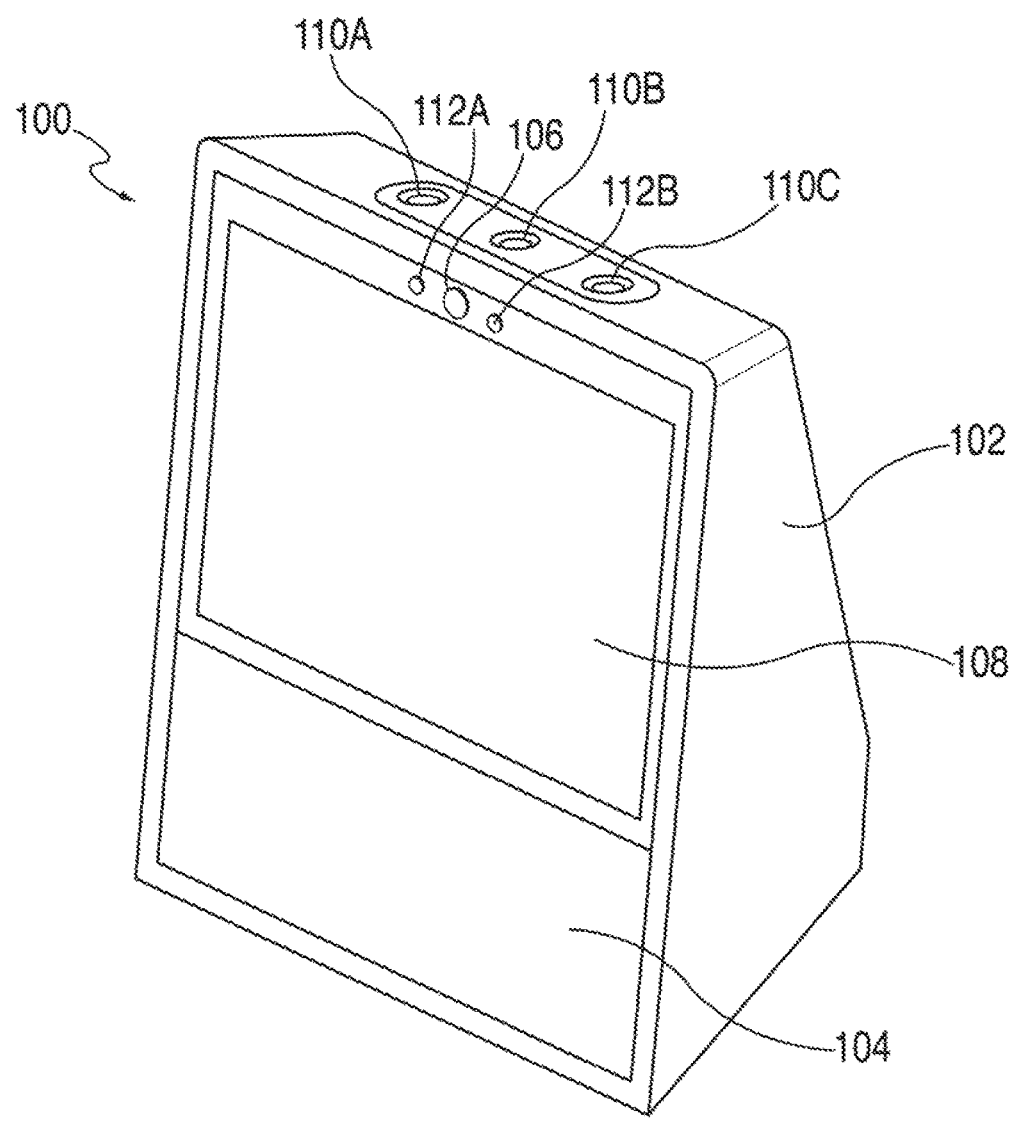
FIG. 1 is an illustrative schematic of a voice activated electronic device in accordance with various embodiments.

FIG. 1 is an illustrative schematic of a voice activated electronic device in accordance with various embodiments. Voice activated electronic device 100, in some embodiments, may include housing 102, speaker 104, camera 106, touch sensitive display unit 108, button 110A, button 110B, and button 110C. Furthermore, housing 102 may include an array of microphones. Housing 102, forms a cavity that amplifies audio from speaker 104 without interfering with the performance of the array of microphones, camera 106, touch sensitive display unit 108, button 110A, button 110B, and button 110C. The array of microphones, speaker 104, camera 106, and various other components may be located within the cavity of housing 102. An array of microphones is discussed in further detail below in the description of FIG. 3.

Housing 102, in one exemplary, non-limiting embodiment, contains one or more components, including, but not limited to, speaker 104, camera 106, an array of microphones, button 110A, button 110B, and button 110C. In some embodiments, housing 102 is air tight. In some embodiments, housing 102 may also contain one or more thermal plates. Thermal plates may be made out of any thermally conductive material. The one or more thermal plates may be coupled to housing such that heat transferred to the one or more thermal plates may be transferred out of housing 102. The one or more thermal plates, in some embodiments, may be designed to transfer heat from inside housing 102 to outside housing 102. For example, excess heat created by the operation of speaker 104 may be transferred to one or more thermal plates within housing 102. When the one or more thermal plates receives the excess heat, the one or more thermal plates may transfer the excess heat outside the housing 102. In one embodiment, the one or more thermal plates transfer excess heat through the bottom of housing 102.

Housing 102, in some embodiments, may be made of various types of or combinations of plastic. Some types of plastic include, Polycarbonate, Polypropylene, Polythene, and Acrylic. Persons of ordinary skill in the art will recognize that this list of types of plastics is not exhaustive and any types or combinations thereof may be used.

Speaker 104 can be any electrical device capable of converting electrical signals into vibrations of air. These vibrations in some embodiments, are output into housing 102 which amplifies the vibrations. In some embodiments, speaker 104 is a passive speaker. In another embodiments, speaker 104 is a powered speaker (also known as an active speaker). In another embodiment, speaker 104 includes more than one speaker. Multiple speakers, in some embodiments, may output sound in either a stereophonic (i.e. stereo) method or monophonic (i.e. mono) method. Furthermore, in some embodiments, the multiple speakers may output sound in tandem. In some embodiments, a vibration mitigator may surround speaker 104. The vibration mitigator may be any material that will dampen excess vibration caused by the operation of voice activated electronic device 100. In some embodiments, the vibration mitigator may be made of foam.

Camera 106 may be any device that can record visual images in the form of photographs, film, or video signals. In one exemplary, non-limiting embodiment, camera 106 is a digital camera that encodes digital images and videos digitally and stores them on local or cloud-based memory. In some embodiments, a vibration mitigator may surround camera 106. The vibration mitigator may be any material that will dampen excess vibration caused by the operation of voice activated electronic device 100. In some embodiments, the vibration mitigator may be made of foam.

Touch sensitive display unit 108 may be any device that can output data in a visual form. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. In some embodiments, a vibration mitigator may surround touch sensitive display unit 108. The vibration mitigator may be any material that will dampen excess vibration caused by the operation of voice activated electronic device 100. In some embodiments, the vibration mitigator may be made of foam.

Button 110A, button 110B, and button 110C may refer to any material that, when pressed by a user, may cause voice activated electronic device 100 to perform a function. For example, button 110A may refer to a mute button. A mute button, in some embodiments, may cause the microphones to stop recording or listening. Button 110B may be a button that increases the volume. Button 110C may be a button to decrease the volume. For example, if button 110B is pressed, a circuit is closed causing speaker 104 to increase the volume of sound output. In some embodiments, button 110A, button 110B, and button 110C may be mechanically coupled to housing 102 and electrically coupled to a printed circuit board.

In some embodiments, housing 102 is mechanically coupled to speaker 104. Speaker 104 may be mechanically coupled to housing 102 by using a frame. Speaker 104 may be attached to said frame through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 100 from effecting the performance of the screw. Once speaker 104 is attached to the frame, the frame may be mechanically coupled to housing 102 through the use of screws. In some embodiments, screws may be installed with a fastening material. Speaker 104 may also be electrically coupled to a logic board. A logic board, in some embodiments, is a printed circuit board. A logic board, in some embodiments, may contain, and/or facilitate communication with, central processing units and memory. In some embodiments, the logic board electrically coupled to speaker 104 may also be mechanically coupled to a frame that is mechanically coupled to housing 102.

In some embodiments, housing 102 is mechanically coupled to camera 106. Camera 106 may be attached through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 100 from effecting the performance of the screw. Camera 106 may also be electrically coupled to a printed circuit board. In some embodiments, the printed circuit board electrically coupled to camera 106 may be mechanically coupled to housing 102.

In some embodiments, housing 102 is mechanically coupled to touch sensitive display unit 108. Touch sensitive display unit 108 may be mechanically coupled to housing 102 by using a frame. Touch sensitive display unit 108 may be attached to said frame through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 100 from effecting the performance of the screw. Once touch sensitive display unit 108 is attached to the frame, the frame may be mechanically coupled to housing 102 through the use of screws. In some embodiments, screws may be installed with a fastening material. Touch sensitive display unit 108 may also be electrically coupled to a logic board. A logic board, in some embodiments, is a printed circuit board. A logic board, in some embodiments, may contain, and/or facilitate communication with, central processing units and memory. In some embodiments, the logic board electrically coupled to touch sensitive display unit 108 may also be mechanically coupled to a frame that is mechanically coupled to housing 102. In some embodiments, the logic board may be referred to as "control circuitry" and may be coupled to one or more wireless communications devices, as well as one or more additional devices and/or components.

In some embodiments, touch sensitive display unit 108 may include a touch panel. The touch panel may be mechanically coupled to housing 102 through the use of a pressure adhesive. In some embodiments, housing 102 may include a gusset in order to accommodate the pressure required by the pressure adhesive to mechanically couple the touch panel to housing 102. The gusset may be made of any material suitable for stabilizing housing 102 during the installation of the touch panel. Touch panels are described in more detail below in the description of FIG. 3. Gussets are described in more detail below in the description of FIG. 6B.

In some embodiments, every component within housing 102 or attached to housing 102 may have a vibration mitigator. The vibration mitigator may be any material that will dampen excess vibration caused by the operation of voice activated electronic device 100. In some embodiments, the vibration mitigator may be made of foam. Furthermore, in some embodiments, adhesives may be used along with screws to assist in mechanically coupling components to housing 102.

Voice activated electronic device may also include an array of microphones for receiving audio. Furthermore in some embodiments, voice activated electronic device may include one or more Light Emitting Diodes (LED's). Voice activated electronic device is designed such that the operation of housing 102 and speaker 104 does not affect the performance of camera 106, touch sensitive display unit 108 button 110A, button 110B, button 110C, and the array of microphones.

Voice activated electronic device 100 may communicatively couple to a cloud based backend system via wired technologies (e.g., wires, USB, fiber optic cable, etc.), wireless technologies (e.g., RF, cellular, satellite, Bluetooth, etc.), or other connection technologies. The cloud based backend system is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

In some embodiments, voice activated electronic device 100 has radio-frequency identification ("RFID") functionality. In another embodiment, voice activated electronic device 100 has near field communication ("NFC") functionality.

In some embodiments, voice activated electronic device 100 may include an infrared (IR) sensor 112A and an IR emitter 112B. IR sensor 112A and IR emitter 112B in conjunction may be used to determine depth information. For example, in one embodiment, a distance of the user from the device may be determined using IR sensor 112A and IR emitter 112B. Depth determination can be performed by any of the known techniques current known in the art. In some embodiments, based on the distance between the user and the device, content with varying density may be displayed on touch sensitive display unit 108. For example, when the user is at a distance A from the device, the device may display weather data for the current day only. However as the user moves closer to the device and is at a distance B, which is less than distance A, from the device, the device may display weather data for the current week. This is because as the user gets closer to the device, the ability of the user to see denser content increases and as the user moves father away from the device, his/her ability to see dense content decreases. This ensures that the content displayed on the device is always relevant and readable by the user.

Figure 2:
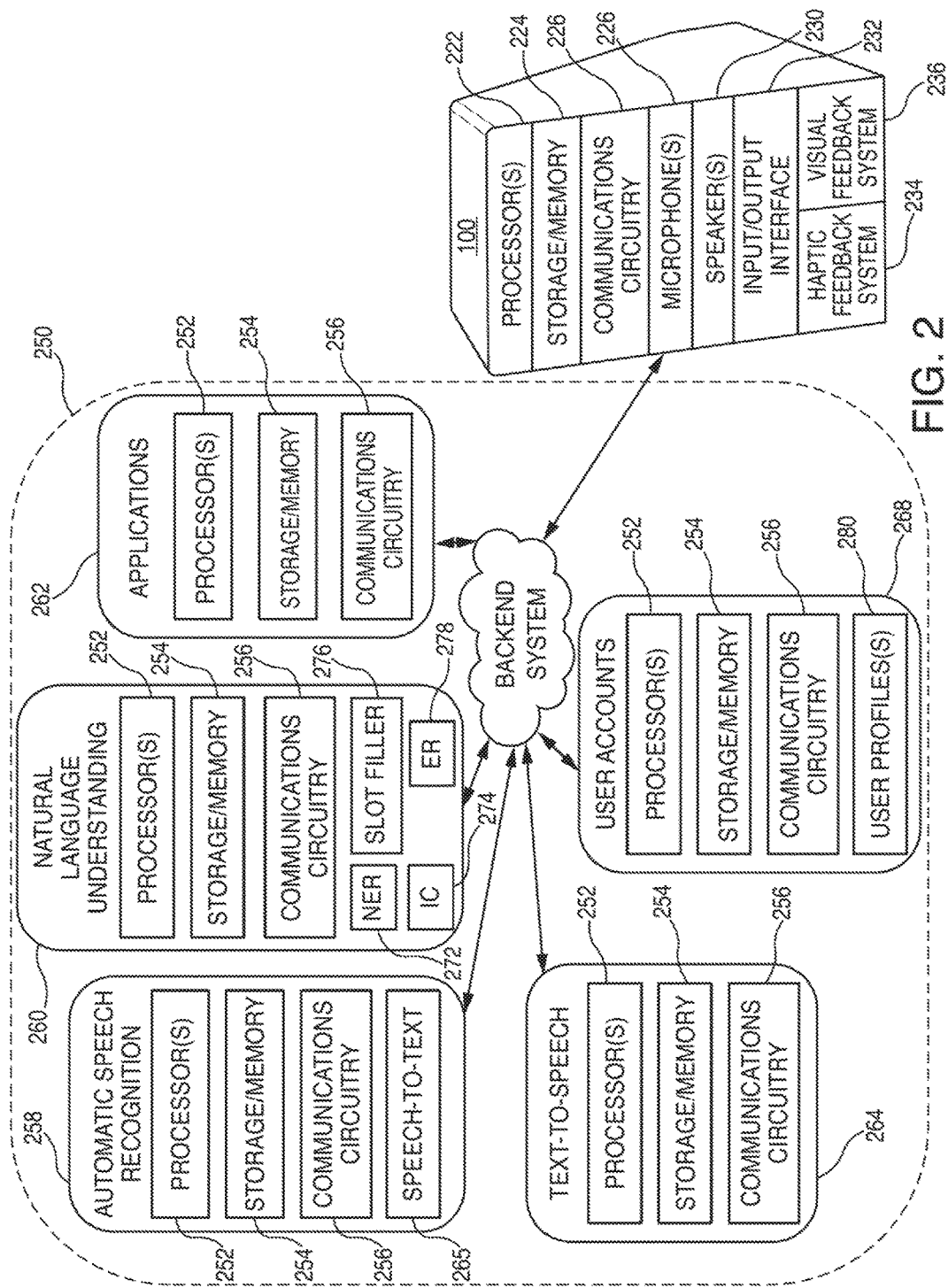
FIG. 2 is an illustrative diagram of the architecture of a voice activated electronic device and a backend system in accordance with various embodiments.

FIG. 2 is an illustrative diagram of the architecture of a voice activated electronic device and a backend system in accordance with various embodiments. Voice activated electronic device 100, in some embodiments, may correspond to any type of electronic device capable of being activated in response to detecting a specific sound, such as a voice activated electronic device. After detecting a specific sound (e.g., a wakeword or trigger), voice activated electronic device 100 may, in some embodiments, recognize commands (e.g., audible commands, inputs) within captured audio, and may perform one or more actions in response to the received commands. Voice activated electronic device 100 may correspond to any suitable type of electronic device including, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, and/or smart accessories. In some embodiments, voice activated electronic device 100 may be relatively simple or basic in structure such that no mechanical input option(s) (e.g., keyboard, mouse, track pad) or touch input(s) (e.g., touchscreen, buttons) may be provided. For example, voice activated electronic device 100 may be a voice activated electronic device, and may be able to receive and output audio, and may include power, processing capabilities, storage/memory capabilities, and communication capabilities. However, in some embodiments, voice activated electronic device 100 may include one or more mechanical input options and or touch input components.

Voice activated electronic device 100 may, in an illustrative non-limiting embodiment, include a minimal number of input mechanisms, such as a power on/off switch. However primary functionality, in one embodiment, of voice activated electronic device 100 may solely be through audio input and audio output. For example, voice activated electronic device 100 may listen for a wakeword by continually monitoring local audio. In response to the wakeword being detected, voice activated electronic device 100 may establish a connection with backend system 250, send audio data to backend system 250, and await/receive a response from backend system 250.

In some embodiments, however, voice activated electronic device 100 may manually activated functionalities. For instance, in response to detecting a manual input, voice activated electronic device 100 may also communicate with backend system 250. For example, in response to pressing and holding a button, tapping a button or touch screen, or providing any other suitable manual input, voice activated electronic device 100 may be configured to record audio. Furthermore, voice activated electronic device 100 may also be configured to establish a connection with backend system 250, send audio data representing the recorded audio to backend system 250, and await/receive a response from backend system 250, in response to the manual input and the audio being recorded.

Voice activated electronic device 100 may include one or more processors 222, storage/memory 224, communications circuitry 226, one or more microphones 228 or other audio input devices (e.g., transducers), one or more speakers 230 or other audio output devices, an input/output ("I/O") interface 232, a haptic feedback system 234, and a visual feedback system 236. However, one or more additional components may be included within voice activated electronic device 100, and/or one or more components may be omitted. For example, voice activated electronic device 100 may include a power supply or a bus connector. As another example, voice activated electronic device 100 may not include an I/O interface (e.g., I/O interface 232). Furthermore, while multiple instances of one or more components may be included within voice activated electronic device 100, for simplicity only one of each component has been shown.

Processor(s) 222 may include any suitable processing circuitry capable of controlling operations and functionality of voice activated electronic device 100, as well as facilitating communications between various components within electronic device 100. In some embodiments, processor(s) 222 may include a central processing unit ("CPU"), a graphic processing unit ("GPU"), one or more microprocessors, a digital signal processor, or any other type of processor, or any combination thereof. In some embodiments, the functionality of processor(s) 222 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 222 may include its own local memory, which may store program modules, program data, and/or one or more operating systems. However, processor(s) 222 may run an operating system ("OS") for electronic device 100, and/or one or more firmware applications, media applications, and/or applications resident thereon.

Storage/memory 224 may include one or more types of storage mediums such as any volatile or non-volatile memory, or any removable or non-removable memory implemented in any suitable manner to store data on electronic device 100. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 224 may be implemented as computer-readable storage media ("CRSM"), which may be any available physical media accessible by processor(s) 222 to execute one or more instructions stored within storage/memory 224. In some embodiments, one or more applications (e.g., gaming, music, video, calendars, lists, etc.) may be run by processor(s) 222, and may be stored in memory 204.

In some embodiments, storage/memory 224 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 250 for processing, or to be processed locally using electronic device 100.

The wakeword database may be a database stored locally on electronic device 100 that includes a list of current wakewords for electronic device 100, as well as one or more previously used, or alternative, wakewords for electronic device 100. In some embodiments, an individual may set or program a wakeword for electronic device 100. The wakeword may be programmed directly on electronic device 100, or a wakeword or words may be set by an individual via a backend system application that is in communication with backend system 250. For example, an individual may use their mobile device having the backend system application running thereon to set the wakeword. The specific wakeword may then be communicated from the mobile device to backend system 250, which in turn may send/notify their voice activated electronic device (e.g., voice activated electronic device 100) of the individual's selection for the wakeword. The selected activation may then be stored in the wakeword database of storage/memory 224. In some embodiments, additional trigger expressions or permutations of the wakeword may also be stored within storage/memory 224. For example, specific trigger expressions or words that indicate the presence of the wakeword may also be stored within storage/memory 224. In some embodiments, audio watermarks, indicating a specific action or message, may also be stored within storage/memory 224.

In some embodiments, sound profiles for different words, phrases, commands, or audio compositions are also capable of being stored within storage/memory 224, such as within a sound profile database. For example, a sound profile of a video or of audio may be stored within the sound profile database of storage/memory 224 on electronic device 100. In this way, if a particular sound (e.g., a wakeword or phrase) is detected by electronic device 100, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold value to determine whether the wakeword may be declared as having been spoken.

The wakeword detection module may compare audio data to stored models or data to detect the presence of a wakeword within an utterance. For instance, the wakeword detection module may apply general large vocabulary continuous speech recognition ("LVCSR") systems to decode audio signals, with wakeword searching conducted in resulting lattices or confusion networks. LVCSR decoding may require relatively large computational resources, however.

In some embodiments, the wakeword detection module may employ a keyword spotter, which may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its MINI model to an MINI model of the trigger expression, yielding a feature score that represents the similarity of the audio signal model to the trigger expression model.

In practice, an HMM recognizer may produce multiple feature scores, corresponding to different features of the MINI models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 100 may then begin transmitting the audio signal to backend system 250 for detecting and responds to subsequent utterances and/or invocations made by an individual.

There may be one or more HMMs built to model the non-wakeword speech characteristics, which are named filler models. Viterbi decoding may be used to search for the best path in the decoding graph, and the decoding output may be further processed to make the decision on keyword presence. This approach can be extended to include discriminative information by incorporating hybrid deep neural network ("DNN")-HMM decoding framework. In another embodiment the wakeword spotting system may be built on DNN/recursive neural network ("RNN") structures directly, without HMM involved. Such a system may estimate the posteriors of wakewords with context information, either by stacking frames within a context window for DNN, or using RNN. Following-on posterior threshold tuning or smoothing may be applied for making decisions. Persons of ordinary skill in the art will recognize that other wakeword detection techniques may also be employed, and the aforementioned are merely exemplary.

Communications circuitry 226 may include any circuitry allowing or enabling electronic device 100 to communicate with one or more devices, servers, and/or systems. For example, communications circuitry 226 may facilitate communications between electronic device 100 and backend system 250, between electronic device 100 and one or more additional electronic devices, and/or between electronic device 100. Communications circuitry 226 may use any communications protocol, such as any of the previously mentioned exemplary communications protocols. In some embodiments, voice activated electronic device 100 may include an antenna to facilitate wireless communications with a network using various wireless technologies (e.g., Wi-Fi, Wi-Fi Direct, Bluetooth®, radiofrequency, etc.). In yet another embodiment, voice activated electronic device 100 may include one or more universal serial bus ("USB") ports, one or more Ethernet or broadband ports, and/or any other type of hardwire access port so that communications circuitry 226 allows electronic device 100 to communicate with one or more communications networks.

Electronic device 100 may also include one or more microphones 228 and/or transducers. Microphone(s) 228 may be any suitable component capable of detecting audio signals. For example, microphone(s) 228 may include one or more sensors for generating electrical signals and circuitry capable of processing the generated electrical signals. In some embodiments, microphone(s) 228 may include multiple microphones capable of detecting various frequency levels. As an illustrative example, voice activated electronic device 100 may include multiple microphones (e.g., four, seven, ten, etc.) placed at various positions about electronic device 100 to monitor/capture any audio outputted in the environment where electronic device 100 is located. The various microphones 228 may include some microphones optimized for distant sounds (e.g., far-field microphones), while some microphones may be optimized for sounds occurring within a close range of electronic device 100.

Electronic device 100 may further include one or more speakers 230. Speaker(s) 230 may correspond to any suitable mechanism for outputting audio signals. For example, speaker(s) 230 may include one or more speaker units, transducers, arrays of speakers, and/or arrays of transducers that may be capable of broadcasting audio signals and or audio content to a surrounding area where electronic device 100 may be located. In some embodiments, speaker(s) 230 may include headphones or ear buds, which may be wirelessly wired, or hard-wired, to electronic device 100, that may be capable of broadcasting audio directly to an individual.

In some embodiments, one or more microphones 228 may serve as input devices to receive audio inputs. Voice activated electronic device 100, in the previously mentioned embodiment, may then also include one or more speakers 230 to output audible responses or follow-up statements. In this manner, voice activated electronic device 100 may function solely through speech or audio, without the use or need for any input mechanisms or displays.

In one exemplary embodiment, voice activated electronic device 100 includes I/O interface 232. The input portion of I/O interface 232 may correspond to any suitable mechanism for receiving inputs from an individual operating electronic device 100. For example, a camera, keyboard, mouse, joystick, or external controller may be used as an input mechanism for I/O interface 232. The output portion of I/O interface 232 may correspond to any suitable mechanism for generating outputs from electronic device 100. For example, one or more displays may be used as an output mechanism for I/O interface 232. As another example, one or more lights, light emitting diodes ("LEDs"), or other visual indicator(s) may be used to output signals via I/O interface 232 of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

In some embodiments, voice activated electronic device 100 may further include a haptic feedback system 234. Haptic feedback system 230 may include, in a non-limiting, exemplary embodiment, one or more force or pressure sensor(s), one or more location or position sensors, one or more light sensors, one or more vibrational mechanism, one or more tactile mechanisms, and one or more additional sensory mechanisms (e.g., a motion sensor). Furthermore, haptic feedback system 234 may also include a rules database, which may include various rules of actions to be performed by vibrational mechanisms, tactile mechanisms, and/or additional sensory mechanisms in response to force sensor(s), location sensor(s), and/or light sensor(s) detecting a particular input.

Force sensor(s) may, in one embodiment, measure an amount of force being applied to a particular component of electronic device 100. Various types of force sensors may include, but are not limited to, capacitive sensors, induction sensors, piezo restrictive sensors, optical sensors, Hall Effect sensors, mechanical (e.g., springs) sensors, temperature sensors, or any other type of force sensor, or any combination thereof. Persons of ordinary skill in the art will further recognize that force sensor(s) may also be capable of determining an amount of pressure currently being applied to an object, and the aforementioned is merely exemplary.

Location sensor(s), in one embodiment, may measure a location and/or position of electronic device 100. For example, location sensor(s) may correspond to global positioning system ("GPS") sensor, capable of measuring a position of electronic device 100 using one or more GPS satellites. However, persons of ordinary skill in the art will recognize that any suitable type of location sensor may be employed, and the aforementioned is merely exemplary.

Light sensor(s) may, in one embodiment, measure an amount of light present within or about electronic device 100. For example, light sensor(s) may correspond to an ambient light sensor, or sensors, capable of determining an amount of ambient light present within a local environment of electronic device 100. If the ambient light level is low (e.g., an amount of ambient light detected is less than a certain threshold value), for instance, then this may indicate that it is dark out, such as during the night. As another example, if the ambient light sensor is located on a front face of electronic device 100, and the ambient light sensor detects a low level of ambient light, this may indicate that an individual is currently holding electronic device 100 such that their hand is covering the ambient light sensor.

Vibrational mechanism(s) may correspond to any suitable vibrational element capable of causing one or more components of electronic device 100 to vibrate. Vibrational mechanism(s) may, in one embodiment, correspond to a motor coupled to a weight, which may be mounted off-center to one of the motor's gears. When the motor spins, the off-center mounting causes a vibrational motion to occur, whose intensity may be correlated with the rotational velocity of the gear(s). However, persons of ordinary skill in the art will recognize that the aforementioned is merely exemplary, and any suitable vibrational mechanism may be employed.

Tactile mechanisms, in one embodiment, correspond to various types of tactile mechanisms that provide various tactile responses based on certain conditions. For example, certain surfaces, such as glass, metal, plastic, etc., may, in response to having a voltage applied, simulate a particular sensation or surface. As an illustrative example, applying a first voltage to a glass surface may cause an individual to perceive the surface as being smooth, while a second voltage being applied may cause the individual to perceive the surface as being rough. The various types of perceived surfaces may vary depending on the material that the surface is made of, and the current applied thereto.

Additional sensory mechanism(s) may correspond to any additional sensory feedback mechanism that may also be employed by electronic device 100. For example, compressed air may be used such that, in response to a certain input, an amount of compressed air is applied in the direction of an individual's face or body. As another example, fragrance systems may be employed that output different aromas in response to different inputs. Still further, additional sensory mechanism(s) may include audio feedback means, or any other mechanism with which a sensory response may be received by an individual.

Rules database may include a plurality of rules and instructions of actions to be performed by one or more of vibrational, tactile, and/or additional sensory mechanisms, respectively, in response to one or more of force, location, and/or light sensors detecting a particular condition. For example, if electronic device 100 determines that a wakeword has been uttered, it may cause a particular tactile response to be perceived by an individual, via tactile mechanism.

Visual feedback system 236 may, for instance, be substantially similar to haptic feedback system 234, with the exception that visual feedback system 236 may include one or more visual mechanisms with which to use to provide feedback. Visual feedback system 236 may, therefore, also include one or more instances of force, location, and/or light sensor(s), or visual feedback system 236 and haptic feedback system 234 may both employ a same set of force, location, and/or light sensor(s). Visual feedback system 236 may, in some embodiments, include one or more display screens or LED lights that are configured to output an image, video, or light pattern, in response to a particular input. For example, one or more LED lights may be included on a voice activated electronic device such that, when microphone(s) 208 receive audio, the one or more LED lights become illuminated signifying that audio has been received by the voice activated electronic device. As another example, the one or more LED lights may become illuminated, blink, or pulse in response to backend system 250 sending an instruction indicating that a speech endpoint has been determined. Furthermore, persons of ordinary skill in the art will recognize that haptic feedback system 234 and visual feedback system 236 may be used separately or in conjunction with one another.

Backend system 250 may include various components and modules including, but not limited to, automatic speech recognition ("ASR") module 258, natural language understanding ("NLU") module 260, applications module 262, text-to-speech ("TTS") module 264, and user accounts module 268. In some embodiments, backend system 250 may also include computer readable media, including, but not limited to, flash memory, random access memory ("RAM"), and/or read-only memory ("ROM"). Backend system 250 may also include various modules that store software, hardware, logic, instructions, and/or commands for backend system 250, such as a speaker identification ("ID") module, or any other module, or any combination thereof.

ASR module 258 may be configured to recognize human speech in detected audio, such as audio captured by electronic device 100, which may then be transmitted to backend system 250. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 222, storage/memory 224, and communications circuitry 226, which are described in greater detail above, and the aforementioned descriptions may apply. Furthermore, in some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by backend system 250, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

For instance, ASR module 258 may transcribe received audio data into text data representing the words of the speech contained in the audio data using STT module 266. The text data may then be used by other components for various purposes, such as executing system commands, inputting data, etc. ASR module 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR module 258 may output the most likely text recognized in the audio data. ASR module 258 may also output multiple hypotheses in the form of a lattice or an N-best list with each hypothesis corresponding to a confidence score or other score (such as probability scores, etc.).

ASR module 258 may further attempts to match received feature vectors to language phonemes and words as known in acoustic models and language models stored within storage/memory 254 of ASR module 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, video, books, shopping, etc.

ASR module 258 may generate results in the form of a single textual representation of the speech, an N-best list including multiple hypotheses and respective scores, and/or lattice, for example, which may be sent to NLU module 260 for processing, such as conversion of the text into commands for execution, either by electronic device 100, backend system 250, or by another device, such as a separate device or server capable of performing one or more additional functionalities thereon (e.g., a television capable of outputting video content).

NLU module 260 may be configured such that it determines an intent of an utterance based on the received audio data. For example, NLU module 260 may determine that the intent of an utterance is for content (e.g., a song or video to be played on a local device). In response to determining the intent of an utterance, NLU module 260 may communicate the received command to an appropriate subject matter server, application, or skill on applications module 262 to cause one or more specific functionalities to be accessed, perform one or more tasks, and/or retrieve an appropriate response or response information. NLU module 260 may include processor(s) 252, storage/memory 254, and communications circuitry 256 which, in one embodiment, may be substantially similar to processor(s) 222, storage/memory 224, and communications circuitry 226 of electronic device 200, and the previous description may apply.

NLU module 260 may include a named entity recognition ("NER") module 272, which may be used to identify portions of text that correspond to a named entity recognizable by NLU module 260. A downstream process called named entity resolution may be configured to link a portion of text to an actual specific known entity. To perform named entity resolution, the system may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU module 260 takes textual input and attempts to make a semantic interpretation of the text. That is, NLU module 260 may be configured to determine a meaning of text based on the individual words and then implements that meaning. In some embodiments, NLU module 260 may interpret a text string to derive an intent or a desired action of the utterance (e.g., utterance 4) as well as the pertinent pieces of information in the text that allow an action to be completed. For example, if a spoken utterance is processed by ASR module 258 and outputs the text, "call mom," NLU module 260 may determine that an intent of the utterance is to activate a telephone, or telephone functionality, and to initiate a call with a contact matching the entity "mom". In some embodiments, NLU module 260 may process several textual inputs related to the same utterance. For example, if ASR module 258 outputs N-text segments (as part of an N-best list), then NLU module 260 may process all N outputs.

As will be discussed further below, NLU module 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU module 260 may be used to provide answer data in response to queries, for example using a knowledge base stored within storage/memory 254 of NLU module 260 and/or storage/memory of backend system 250.

To correctly perform natural language understanding processing of input speech, NLU module 260 may be configured to determine a "domain" of an utterance. By determining the domain, NLU module 260 may narrow down which services and functionalities offered by an endpoint device (e.g., voice activated electronic device 100, backend system 250, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account on backend system 250. Words in a single text query may implicate more than one service, and some services may be functionally linked (e.g., both a telephone service and a calendar service may utilize data from the contact list).

NER module 272 may be configured to receive a query in the form of one or more results from ASR module 258. NER module 272 may then attempt to identify relevant grammars and lexical information that may be used to construe meaning of the one or more results. To do so, NER module 272 may begin by identifying potential domains that may relate to the received query. NLU module 260 may include a database of devices within storage/memory 254 of NLU module 260 that may be used to identify domains associated with specific devices. For example, voice activated electronic device 100 may be associated with domains for music, telephone functionality, calendar information, contact lists, and/or device-specific communications. In addition, NLU module 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping", "music", or "applications". As such, each domain may be associated with a particular language model and/or grammar database, a particular set of intents/actions, and a particular personalized lexicon. Each gazetteer may include domain-indexed lexical information associated with a particular user account of user accounts module 268 and/or electronic device 100. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU module 260 may be configured to apply the rules, models, and information applicable to each identified domain. For example, if a query potentially implicates both communications and music, the query may, substantially in parallel, use the grammar models and lexical information for communications, and may also use the grammar models and lexical information for music. The responses based on the query produced by each set of models is scored, with the overall highest ranked result from all applied domains is ordinarily selected to be the correct result.

An intent classification ("IC") module 274 may parse the query to determine an intent or intents for each identified domain, where the intent corresponds to the action to be performed that is responsive to the query. Each domain is associated with a database of words linked to intents. For example, a music intent database may link words and phrases such as "quiet," "volume off," and "mute" to a "mute" intent. IC module 274 may be configured to identify potential intents for each domain by comparing words in the query to the words and phrases in that domain's intents database. Traditionally, the determination of an intent by IC module 274 is performed using a set of rules or templates that are processed against the incoming text to identify a matching intent.

In order to generate a particular interpreted response, the NER 272 applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC module 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, NER module 272 may parse the query to identify words as subject, object, verb, preposition, etc., based on grammar rules and/or models, prior to recognizing named entities. The identified verb may be used by IC module 274 to identify intent, which is then used by NER module 272 to identify frameworks. A framework for an intent of "play" may specify a list of slots/fields applicable to play the identified "object" and any object modifier (e.g., a prepositional phrase), such as, for example, {Artist Name}, {Album Name}, {Song name}, etc. NER module 272 may then search the corresponding fields in the domain-specific and personalized lexicon(s), attempting to match words and phrases in the query tagged as a grammatical object or object modifier with those identified in the database(s).

This process may include semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a query of "Play Song 1 by Artist 1" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 274 may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, NER module 272 may search the database of generic words associated with the particular domain. So for instance, if the query was "play songs by Artist 1," after failing to determine an album name or song name called "songs" by "Artist 1," NER module 272 may search the domain vocabulary for the word "songs." In the alternative, generic words may be checked before the gazetteer information, or both may be tried, potentially producing two different results.

The results of the natural language understanding processing may be tagged to attribute meaning to the query. So, for instance, "Play Song 1 by Artist 1" might produce a result of: {domain} Music, {intent} Play Music, {artist name} "Artist 1," {media type} SONG, and {song title} "Song 1." As another example, "play songs by Artist 1" might produce: {domain} Music, {intent} Play Music, {artist name} "Artist 1," and {media type} SONG.

The output from NLU module 260 (which may include tagged text, commands, etc.) may then be sent to a command processor, which may be located on, or in communication with, backend system 250. The destination command processor may be determined based on the output of NLU module 260. For example, if NLU module 260 outputs include a command to play music, the destination command processor may be a music playing application, such as one located on electronic device 100 or in a music playing application, configured to execute a music playing command. If the output of NLU module 260, however, includes a search request, the destination command processor may include a search engine processor, such as one located on a search server, configured to execute a search command.

In some embodiments, NLU module 260 may also include an entity resolution ("ER") module 278, which allows NLU module 260 to query each domain of NLU module 260 to determine which domain or domains believe that they can handle a given request. Upon performing the query, each domain of domain module 272 may return a "score" indicating a likelihood that they can handle the skill in question. For instance, various domains may return scores of LOW, MEDIUM, or HIGH, indicating the likelihood that they can handle the particular skill. Entity resolution module 278 may return application names or titles for the request, which may be based on relevance scores that estimate a confidence that a particular application may be best used for the request. As an illustrative example, if the utterance is, "Play My Music," NLU module 260 may determine, using entity resolution module 278, which domains, and thus applications, can likely handle this request, and may select the domain and/or application having the highest confidence score as the domain and/or application to handle the request. Furthermore, as described in greater detail below, NLU module 260 may further include a slot filler module 276.

In a non-limiting embodiment, NLU module 260 may be a multi-domain architecture where each domain (which may include a set of intents and entity slots that define a larger concept such as music, books etc.) is constructed separately and made available to NLU module 260 during runtime operations where natural language understanding functionality operations are performed on text (such as text output from ASR module 258). Each domain may have specially configured components to perform various steps of the NLU operations. For instance, each domain may include a component of NER module 272, IC module 274, Slot Filler module 276, and entity resolution module 278, which may be specific to that particular domain.

For example, a music domain may have an NER component that identifies what slots (i.e., portions of input text) may correspond to particular entities relevant to that domain. For example, for the text "play songs by Artist 1," an NER component trained for a music domain may recognize the portion of text (e.g., "Artist 1") corresponds to an entity and an artist name. The NER component may use a machine learning model, such as a domain specific conditional random field ("CRF") to both identify the portions corresponding to an entity as well as identify what type of entity corresponds to the text portion. For example, for the text "Play 'Song 1'," an NER component trained for an application music playing application domain may recognize the portion of text (e.g., "Song 1") corresponds to a title of a song. The music domain may also have its own intent classification ("IC") component may determine that the intent of the text, assuming that the text is within the proscribed domain. IC components may use a model, such as a domain specific maximum entropy classifier to identify the intent of the text. The music domain may also have its own slot filler component that can apply rules or other instructions to standardize labels or tokens from previous stages into an intent/slot representation. The precise transformation may depend on the domain. For example, a travel domain may include a text mention of "Seattle airport," and may be transform the text mention to the standard three-letter code referring to that airport (e.g., SEA). Specific intent/slot combinations may also be tied to a particular source, which may then be used to resolve the text (such as by providing information or a command to be executed in response to a user query). The music domain may also have its own entity resolution component that can refer to an authority source (such as a domain specific knowledge base) used to specifically identify the precise entity referred to in the entity mention identified in the incoming text. Using the example, "play songs by Artist 1," the source may be tied to a personal music catalog or the like. The output from the entity resolution component may include a command, information, or other NLU result data indicating how the domain specific NLU processing handled the text and how the system should respond to the text, according to that specific domain.

In some embodiments, the multiple domains of NLU module 260 may operate substantially in parallel, with different domain specific components. Each domain may have its own NER component, IC module, slot filler component, and entity resolution component. The same text that is input into the NLU pipeline for a first domain (e.g., Domain A) may also be input into the NLU pipeline for a second domain (e.g., Domain B), where the components for Domain B may operate on the text as if the text related to Domain B, and so on for the different NLU pipelines for the different domains. Each domain specific NLU pipeline will create its own domain specific NLU results, for example Results A for Domain A, Results B for Domain B, Results C for Domain C, and so on. The different results may then be input into a domain ranking component, which may ranks the different results for the different domains, and selects what the system believes to be the most applicable results given the input text and other factors. Those highest ranking results may then be used to execute a command, perform one or more actions, or obtain information responsive to a user query, or otherwise respond to the input text.

Such a multi-domain architecture results in narrowly defined intents and slots that are particular for each specific domain. This is due, in part, to the different models and components (such as the domain specific NER component, IC module, etc. and related models) being trained to operate only for the designated domain. Further, the separation of domains results in similar actions being represented separately across the domains even if there is overlap in the action. For example, "next song," "next book," and "next" may all be indicators of the same action, but will be defined differently in different domains due to domain specific processing restrictions. Further, domain agnostic queries that cross domains may be difficult to holistically respond to given the divisions between domains. For example, the query "get Title" may refer to a request to purchase a book, play a movie, or play a soundtrack, but the multi-domain architecture and approach of NLU module 260 may result in only one such action being performed with any acknowledgement of ambiguity as the "Title" can refer to a book, movie, or soundtrack (or possibly all three).

Applications module 262 may, for example, correspond to various action specific applications, skills, or servers, which are capable of processing various task specific actions and/or performing various functionalities. Applications module 262 may further correspond to first party applications and/or third party applications capable of performing various tasks or actions, or performing various functionalities. For example, based on the context of the audio received from electronic device 100, backend system 250 may use a certain application to generate a response, or to obtain response information, which in turn may be communicated back to electronic device 100 and/or to another electronic device (e.g., a television). For instance, an utterance may ask a particular song to be played, and therefore applications module 262 may access a music streaming application capable of providing an audio file, or a URL to a website, for the song such that the other electronic device may play the song thereon. Applications module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user accounts or user profiles within user profiles module 280, corresponding to users having a registered account on backend system 250. For example, a parent may have a registered account on backend system 250, and each of the parent's children may have their own user profile registered under the parent's registered account. Information, settings, and/or preferences, for example, for each user profile may be stored within user profile module 280. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. In some embodiments, user accounts module 268 may include a list of media items currently stored within an individual's registered account or user profile. For example, a list of music or videos purchased or obtained by an individual may be stored within the individual's user profile on user accounts module 268, which may be accessed by the individual when the individual seeks to hear a particular song or songs, or view a particular video or videos. Furthermore, user accounts module 268 may store a listing of what content is currently stored locally on one or more devices associated with an individual's user account or profile on user accounts module 268. For example, a listing of what songs or videos are currently stored on electronic device 100 may be stored within a user account of an individual who is a registered user of electronic device 100. Still further, user accounts module 268 may store and monitor a download or upload history for an individual's user account, such that backend system 250 is aware of what content has been downloaded from backend system 250 to electronic device 100 (or any other electronic device associated with the user account) and/or any content that has been uploaded from electronic device 100 to backend system 250.

User accounts module 268 may also include a listing of all applications currently enabled for each user profile stored within user profiles module 280. In some embodiments, NLU module 260 may receive indications of which applications are currently enabled for a particular user profile or account, such that NLU module 260 is aware of which rules and capabilities that backend system 250 is able to perform for the particular user profile or account.

Backend system 250 may, in one embodiment, also include a prompts module including a listing of responses. The listing of responses may include text data of these responses, as well as a prompt identifier for each response's corresponding text. When backend system 250 attempts to determine what response to provide to electronic device 100, whether it is in response to an utterance or an answer to a question, NLU module 260 may receive one or more prompts that most likely may be used for responding to different utterances based on the format of an invocation.

For instance, after an application being enabled, NLU module 260 may receive an indication that a particular prompt is best suited for a response to be sent to electronic device 100 to indicate that the application has been enabled.

In one non-limiting, illustrative embodiment, the listing of responses may be arranged by prompt identifier and corresponding text data representation of a response. When a response is needed to be provided to a requesting device, such as electronic device 100, NLU module 260 polls each domain to determine which domain should likely handle providing the response. Each domain may provide one or more prompt identifiers that correspond to a best response, and NLU module selects the prompt identifier having the highest ranking. For example, similarly to how NLU module 260 determined which domain could handle a particular application, NLU module 260 may also determine scores of LOW, MEDIUM, or HIGH, indicating the likelihood that a particular domain can handle the particular response. However, a particular prompt may be selected using any other suitable technique, and the aforementioned is merely exemplary.

Each prompt identifier may be associated with a particular response, and therefore text data representing that particular response, such that when a prompt is selected to be used, the prompt module is capable of determining that the selected prompt corresponds to a particular response. The text data representing that response may be provided to TTS module 264, which in turn may generate audio data representing that text data. That audio data may be sent to the requesting device (e.g., voice activated electronic device 100), such that an audio message of that response may be output by the requesting device. As an illustrative example, the music domain may select a response a request may be sent to the prompts module to send the text data corresponding to the prompt that is associated with that prompt identifier to TTS module 264. The prompts module may send text data representing the response, "Ok. {Action} {Object}," to TTS module 264. NLU module 260 may further send the slot results for slot {Action} and slot {Object} to TTS module 264, such that the framework of the selected response is formulated, and the text data representing the response may be used to generate audio data. For example, if {Action}: Playing, and {Object}: Song 1, then the response would be, "Ok. Playing 'Song 1'."

Persons of ordinary skill in the art will further recognize that various other prompts may be included within the prompts module. For example, there may be L prompts (e.g., prompts 1, 2, 3, 4, 5, 6 . . . L, where L is any number greater than zero (e.g., L>0)). Similarly, for however many prompts are included, there may be an associated response. For example, the responses with slots may respectively include, but are not limited to, "{Confirmation Status}. {Song Title} is now {Action}."; "Ok. {Artist Name} is {Action}."; and the like.

Persons of ordinary skill in the art will recognize that although each of ASR module 258, NLU module 260, applications module 262, TTS module 264, and user accounts module 268 may each include instances of processor(s) 252, storage/memory 254, and communications circuitry 256, and those instances of processor(s) 252, storage/memory 254, and communications circuitry 256 within each of ASR module 258, NLU module 260, applications module 262, TTS module 264, and user accounts module 268 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Figure 3:
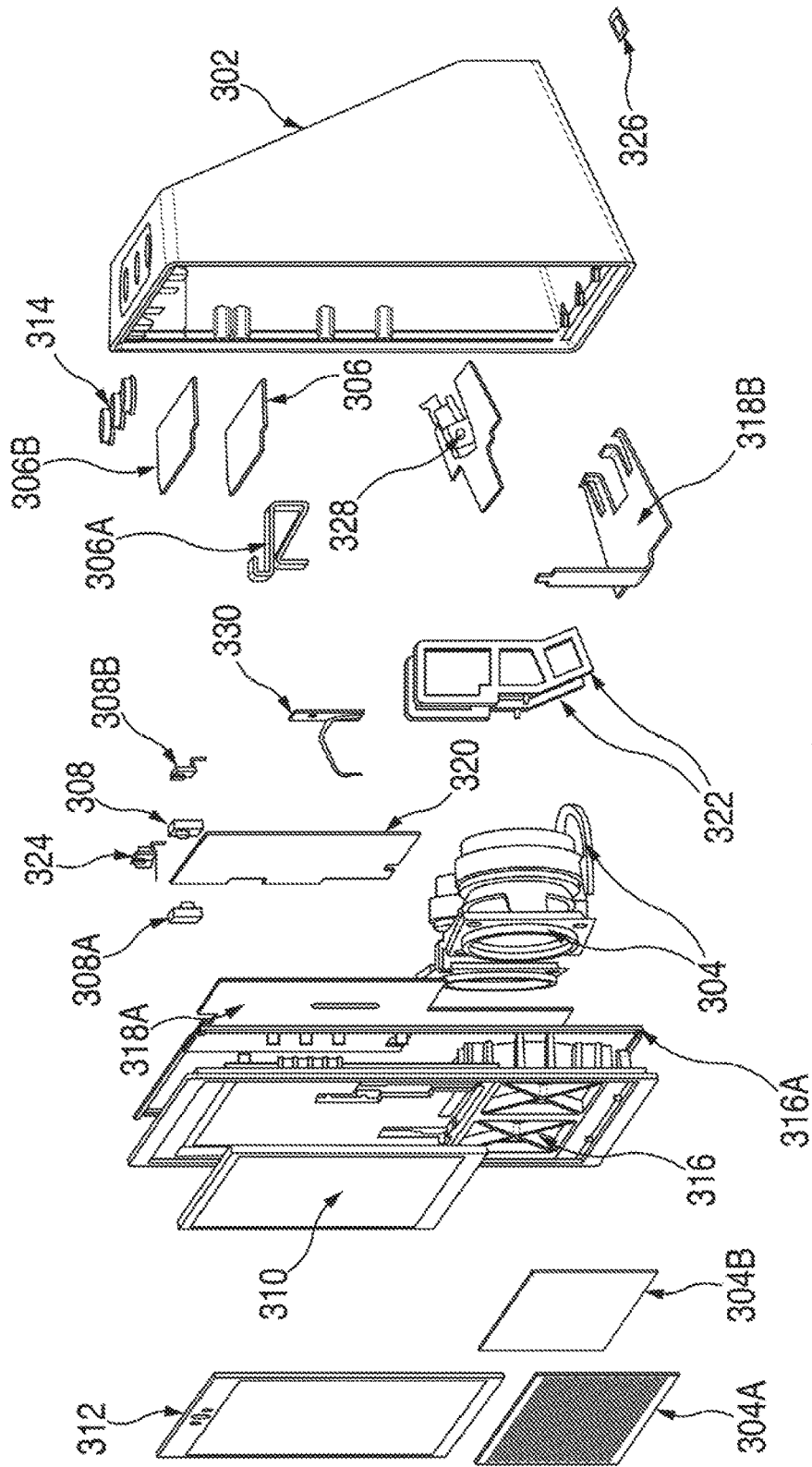
FIG. 3 is an exploded view of a voice activated electronic device in accordance with various embodiments.

FIG. 3 is an exploded view of a voice activated electronic device 300 in accordance with various embodiments. In some embodiments, voice activated electronic device 300 may be similar to voice activated electronic device 100 and the same description applies. Voice activated electronic device 300 may include housing 302, speakers 304, microphone PCB 306, camera 308, display screen 310, and touch panel 312. Housing 302 forms a cavity that amplifies audio from speakers 304 without interfering with the performance of microphone PCB 306, camera 308, display screen 310, and touch panel 312. The cavity formed by housing 302 may contain speakers 304, microphone PCB 306, camera 308 and various other components.

Housing 302, in one exemplary, non-limiting embodiment, includes a back panel, a bottom panel, a top panel, two side panels and a front panel partially formed by display screen 306 and frame 318. The back panel, bottom panel, top panel, two side panels and front panel may form an internal cavity. In one exemplary, non-limiting embodiment, housing 302 contains one or more components, including, but not limited to, speakers 304, camera 308, microphone PCB 306, display screen 310, and touch panel 312. In some embodiments, housing 302 may be mechanically coupled to frame 318. Frame 318 may be designed to be mechanically coupled to one or more components of voice activated electronic device 300. For example, frame 318 mechanically coupled to speakers 304, camera 308, display screen 310, and touch panel 312. A more detailed description of frame 318 and components mechanically coupled thereto is located in the description of FIGS. 7-11. In some embodiments, housing 302 is air tight such that substantially no air or gas is capable of entering or escaping therefrom. In some embodiments, when housing 302 is mechanically coupled to frame 316, sealing foam 316A may provide an air tight seal. In some embodiments, housing 302 may also contain front thermal plate 318A and back thermal plate 318B. Front thermal plate 318A and back thermal plate 318B may be coupled to housing 302 such that heat transferred to front thermal plate 318A and back thermal plate 318B may be transferred out of housing 302 to maintain a suitable operating temperature for voice activated electronic device 300, and the various components housed therein. In some embodiments, front thermal plate 318A may be mechanically coupled to frame 316. Front thermal plate 318A and back thermal plate 318B, in some embodiments, may be designed to transfer heat from inside housing 302 to outside housing 302. In one embodiment, front thermal plate 318A and back thermal plate 318B transfer excess heat through the bottom of housing 302. Housing 302, in some embodiments, may be made of various types of or combinations of plastic. Some types of plastic include, Polycarbonate, Polypropylene, Polythene, and Acrylic. Persons of ordinary skill in the art will recognize that this list of types of plastics is not exhaustive and any types or combinations thereof may be used.

In some embodiments, housing 302 may also have buttons 314. Buttons 314 may refer to any material that, when pressed by a user, may cause voice activated electronic device 300 to perform a function. For example, buttons 314 may control the volume of speakers 304. While three buttons are shown in FIG. 3, persons of ordinary skill recognize that any number of buttons may be used. In some embodiments, housing 32 may also contain RFID 326. RFID 326, in some embodiments, may contain a microchip having an antenna and an interrogator/reader with an antenna. RFID 326 may be a radio frequency identification system. For example, RFID 326 may be used to identify voice activated electronic device 300. RFID 326, in some embodiments, may use a passive tag. In some embodiments, RFID 326 may use active tags. The frequency used by RFID 326 may vary from around 125 KHz to around 13.56 MHz. In some embodiments, voice activated electronic device 300 may also have NFC capabilities. For example, in some embodiments, voice activated electronic device 300 may be able to establish a connection with another electronic device using near-filed communication protocols.

Speakers 304 can be any electrical device capable of converting electrical signals into vibrations of air. These vibrations in some embodiments, are output into housing 302 which amplifies the vibrations. In some embodiments, speakers 304 do not have individual sealed speaker boxes. Rather, in some embodiments, speakers 304 utilize the internal cavity within housing 302 to produce the sound output by speakers 304. In some embodiments, speakers 304 may comprise a speaker driver. In some embodiments, speakers 304 are passive speakers. In another embodiments, speakers 304 are powered speakers (i.e. an active speaker). Speakers 304, in some embodiments, may output sound in either a stereophonic (i.e. stereo) method or monophonic (i.e. mono) method. Furthermore, in some embodiments, the speakers 304 may output sound in tandem. In some embodiments, a vibration mitigator may surround speakers 304. The vibration mitigator may be any material that will dampen excess vibration caused by the operation of voice activated electronic device 300. In some embodiments, the vibration mitigator may be made of foam. In some embodiments, speakers 304 may have speaker grill 304A and felt 304B. Speaker grill 304A and felt 304B may be mechanically coupled to frame 316. A more detailed explanation of a grill is shown in the description of FIG. 14B. Felt 304B, in some embodiments, may be made from a cloth or fabric that is specifically designed to allow easy transmission of sound. Felt 304B, in some embodiments, may allow the transmission of sound at frequencies between 20 Hz and 20 kHz.

Figure 4B:
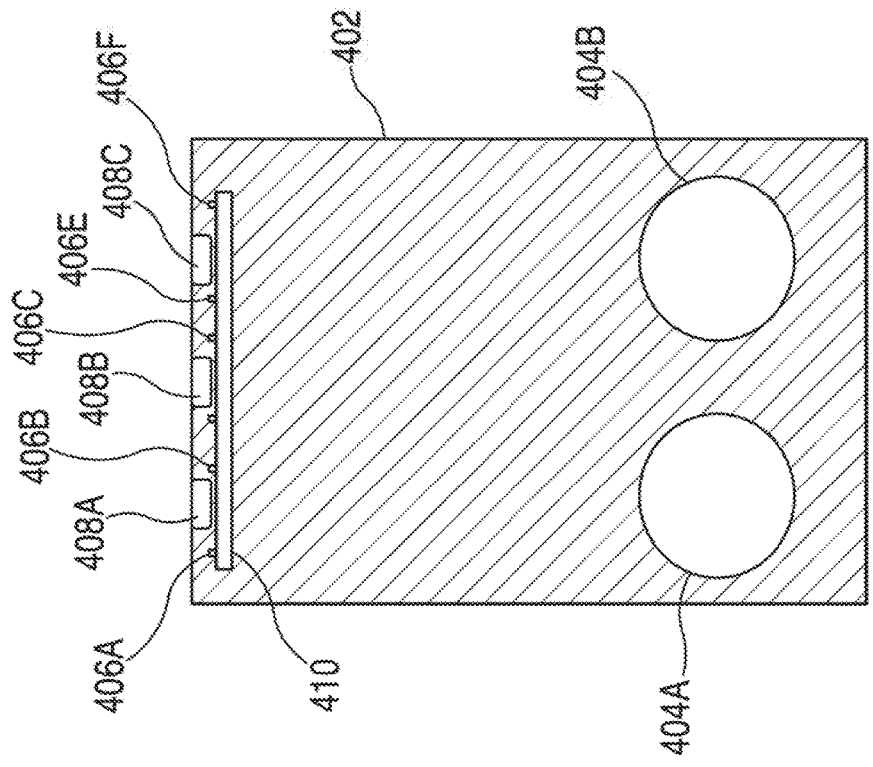
FIG. 4B is a cross-sectional view of FIG. 4A in accordance with various embodiments.
Figure 6B:
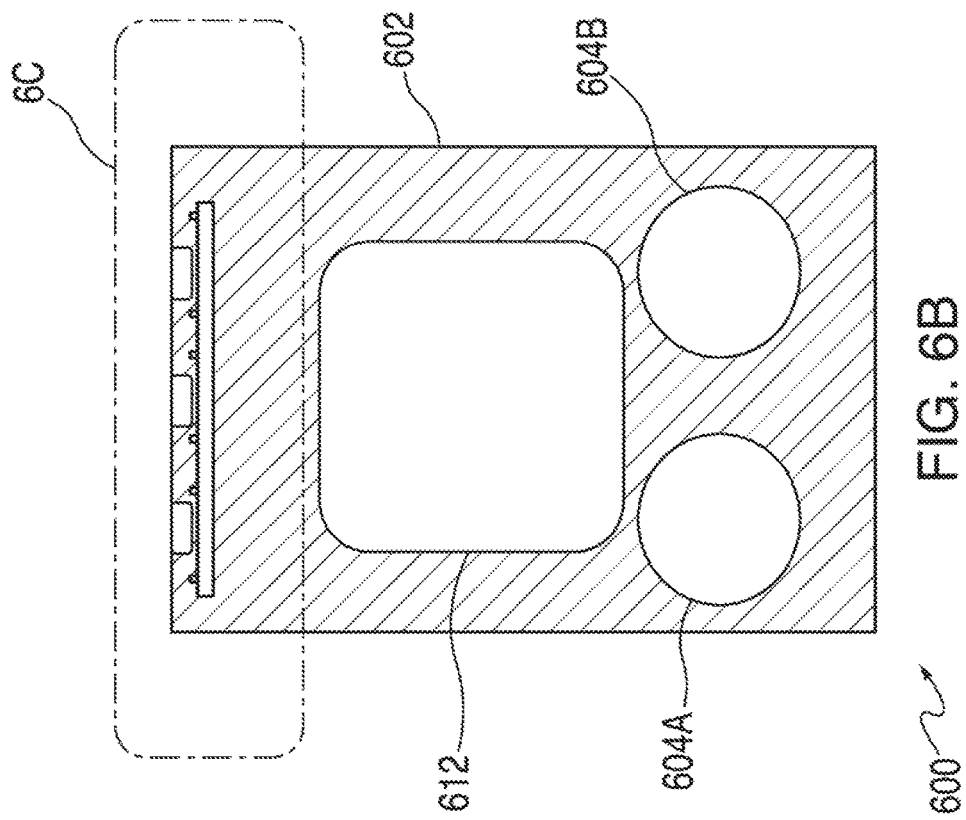
FIG. 6B is a cross-sectional view of FIG. 6A in accordance with various embodiments.

Microphone PCB 306, in some embodiments, may refer to a printed circuit board. A printed circuit board, may contain, and/or facilitate communication with, central processing units and memory. In some embodiments, microphone PCB 306 may be mechanically and electrically coupled to one or more microphones. In some embodiments, the one or more microphones may be an array of microphones (as shown in FIGS. 4B, 6B, and 6C). The array of microphones of microphone PCB 306, in some embodiments, are omnidirectional microphones. The array of microphones of microphone PCB 306, in some embodiments, are directional microphones. In one, non-limiting, exemplary embodiment, microphone PCB 306 is located a sufficient distance away from speakers 304 in housing 302, such that input audio is capable of being received by one or more microphones of microphone PCB 306 when speakers 304 are producing/playing output audio. For example, if speakers 304 are playing a song, one or more microphones of microphone PCB 306 may still be able to detect a wakeword being spoken by a user. Furthermore, in some embodiments, a vibration mitigator may be mechanically coupled to microphone PCB 306. A vibration mitigator may refer to a material that may dampen vibrations caused by the operation of housing 302 and speakers 304. The vibration mitigator may be made from foam. Microphone PCB 306, in some embodiments, may be mechanically coupled to housing 302. In some embodiments, microphone PCB 306 may be mechanically coupled to housing 302 using screws. In some embodiments, microphone PCB 306 may be mechanically coupled and electrically coupled to planar flex 306A. Planar flex 306A may stabilize microphone PCB 306. Planar flex 306A, in some embodiments, may be a flexible printed circuit board. In some embodiments, microphone PCB 306 may also have planar sealing foam 306B. Planar sealing foam 306B, in some embodiments, make an airtight seal between microphone PCB 306 and housing 302. Planar sealing foam 306B, in some embodiments, may act as a vibration mitigator for microphone PCB 306. Planar sealing foam 306B may also, in some embodiments, acoustically isolate the one or more microphones of microphone PCB 306.

Camera 308 may be any image capturing device that can record visual images in the form of photographs, film, or video signals. In one exemplary, non-limiting embodiment, camera 308 is a digital camera that encodes digital images and videos digitally and stores them on local or cloud-based memory. In some embodiments, camera 308 may be mechanically coupled to carrier 308A and plate 308B. Camera 308 may be secured in carrier 308A. In some embodiments, once camera 308 is secured in carrier 308A, carrier 308A may be mechanically coupled to plate 308B. Once carrier 308A and plate 308B are mechanically coupled, plate 308A may be mechanically coupled to frame 316. A more detailed description of a camera, carrier, and plate is below in the description of FIG. 9. Camera 308 may be electrically coupled to logic board 320. In some embodiments, a vibration mitigator may surround camera 308. The vibration mitigator may be any material that will dampen excess vibration caused by the operation of voice activated electronic device 300. In some embodiments, the vibration mitigator may be made of foam.

In some embodiments, display screen 310 and touch panel 312 together make up a touch sensitive display unit. Display screen 310 may be any display that can output content in a visual form. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. In some embodiments, display screen 310 may be a display that can output content. Examples of content can be, but are not limited to, text, 3GP files, Adobe files, Graphics Interchange Format files (GIF), JPEG files, JPG files, MPEG files, MPEG Audio files, MPEG Video files, movies, and images. Persons of ordinary skill in the art will recognize that this list is not limiting or exhaustive. Persons of ordinary skill will recognize that a non-exhaustive list is written merely for exemplary purposes and that any type of content may be displayed on display screen 310. In some embodiments, display screen 310 receives light from LED 324. In some embodiments, LED 324 is one or more LED lights. In some embodiments, a vibration mitigator may surround display screen 310. The vibration mitigator may be any material that will dampen excess vibration caused by the operation of voice activated electronic device 300. In some embodiments, the vibration mitigator may be made of foam.

Touch panel 312 may be mechanically coupled to housing 302 and electrically coupled to display screen 312. In some embodiments, touch panel 312 may be mechanically coupled to the housing through the use of a pressure adhesive. Touch panel 312 may detect touch input in a variety of ways. For example, a touch input may be registered by detecting the change in resistance of current when a point on touch panel 312 is touched. This may be accomplished by having two separate layers of touch panel 312. Generally, the bottom layer is made of glass and the top layer may be made of a plastic film. When an individual pushes down on the film and the film makes contact with the glass, it completes the circuit. Both the glass and the film may be covered with a grid of electrical conductors. The conductors may be comprised of fine metal wires. They also may be comprised of a thin film of transparent conductor material. In some embodiments, the conductor material may be indium tin oxide (ITO). In some embodiments, electrodes on the two layers run at perpendicular to each other. For example, the conductors on the glass sheet may run in one direction and the conductors on the plastic film may run in a direction 90 degrees from the conductors on the glass sheet. When a touch input is detected, an individual may press down on touch panel 312. When the film is pressed down on, contact is made between the grid of electrical conductors on the glass screen and the grid of electrical conductors on the plastic film, completing the circuit. When the circuit is completed, the voltage of the circuit is measured. The point on the screen may be measured based on the amount of resistance at the contact point. The voltage may then be converted by analog to digital converters, creating a digital signal that voice activated electronic device 300 can use as an input signal from a touch input.

As another example, voice activated electronic device 300 may use projected capacitance. Voice activated electronic device 300 may rely on electrical capacitance. Touch panel 312 may use two layers of conductors, separated by an insulator. The conductors, for example, may be made of transparent ITO. In some embodiments, conductors on the two layers run at perpendicular to each other. For example, the conductors on the glass sheet may run in one direction and the conductors on the plastic film may run in a direction 90 degrees from the conductors on the glass sheet. When a touch input is detected, the touch input takes electrical charge from each of the conductive layers at the point of the touch input. This change in charge can be measured and a location of the touch input can be measured. Each conductor may be checked separately, making it possible to identify multiple, simultaneous points of contact on touch panel 312. While only two examples of how a touch input can be detected by touch panel 312 are described, persons of ordinary skill recognize that any suitable technique for detecting a touch input can be used, and the aforementioned are merely exemplary.

In some embodiments, a protective layer might be placed over the touch panel. The protective layer, in some embodiments, may be mechanically coupled to housing 302 by suing frame 316. In some embodiments, the protective glass may be mechanically coupled to touch panel 312. The layer of protective glass may be made of any translucent material suitable for protecting a touch panel or display screen.

In some embodiments, housing 302 is mechanically coupled to speakers 304. Speakers 304 may be mechanically coupled to housing 302 by using frame 316. Speaker 104 may be attached frame 316 through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 300 from effecting the performance of the screw. Once speakers 304 is attached to frame 316, frame 316 may be mechanically coupled to housing 302 through the use of screws. In some embodiments, screws may be installed with a fastening material. Speakers 304 may also be electrically coupled to logic board 320. Logic board 320, in some embodiments, is a printed circuit board. Logic board 320, in some embodiments, may contain, and/or facilitate communication with, central processing units and memory. In some embodiments, the logic board may be referred to as "control circuitry" and may be coupled to one or more wireless communications devices, as well as one or more additional devices and/or components. In some embodiments, logic board 320 may also be mechanically coupled to frame 316. Logic board 320, in some embodiments may be electrically coupled to camera 308, microphone PCB 306, LED 324, and IO board 328. IO board 328 may be an input/output board. In some embodiments, IO board 328 may be a printed circuit board. In some embodiments IO board 328 may contain, and/or facilitate communication with, central processing units and memory. In some embodiments, logic board 320 may also be electrically coupled to antenna 330. Antenna 330, in some embodiments, may be a Bluetooth antenna. A Bluetooth antenna, in some embodiments, may an antenna that facilitates short-range wireless interconnection between voice activated electronic device 300 and another electronic device. Antenna 330, in some embodiments, may be mechanically coupled to frame 316.

In some embodiments, housing 302 is mechanically coupled to microphone PCB 306. Microphone PCB 306 may be attached through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 300 from effecting the performance of the screw. Microphone PCB 306 may also be electrically coupled to a printed circuit board. In some embodiments, the printed circuit board electrically coupled to microphone PCB 306 may be mechanically coupled to housing 302.

In some embodiments, housing 102 is mechanically coupled to camera 308. Camera 308 may be attached through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 300 from effecting the performance of the screw. Camera 308 may also be electrically coupled to a printed circuit board. In some embodiments, the printed circuit board electrically coupled to camera 308 may be mechanically coupled to housing 302.

In some embodiments, housing 302 is mechanically coupled to display screen 310. Display screen 310 may be mechanically coupled to housing 302 by through frame 316. Display screen 310 may be attached frame 316 through the use of screws. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 300 from effecting the performance of the screw. Once display screen 310 is attached to frame 316, frame 316 may be mechanically coupled to housing 302 through the use of screws. In some embodiments, screws may be installed with a fastening material. Display screen 310 may also be electrically coupled to a logic board. A logic board, in some embodiments, is a printed circuit board. A logic board, in some embodiments, may contain, and/or facilitate communication with, central processing units and memory. In some embodiments, the logic board electrically coupled to display screen 310 may also be mechanically coupled to a frame that is mechanically coupled to housing 302.

In some embodiments, touch panel 312 may be mechanically coupled to housing 302 through the use of a pressure adhesive. In some embodiments, housing 302 may include gusset 322 in order to accommodate the pressure required by the pressure adhesive to mechanically couple touch panel 312 to housing 302. Gusset 322 may be made of any material suitable for stabilizing housing 302 during the installation of touch panel 312. Gussets are described in more detail below in the description of FIG. 6B.

In some embodiments, every component within housing 302 or attached to housing 302 may have a vibration mitigator. The vibration mitigator may be any material that will dampen excess vibration caused by the operation of voice activated electronic device 300. In some embodiments, the vibration mitigator may be made of foam. Furthermore, in some embodiments, adhesives may be used along with screws to assist in mechanically coupling components to housing 302.

Figure 4A:
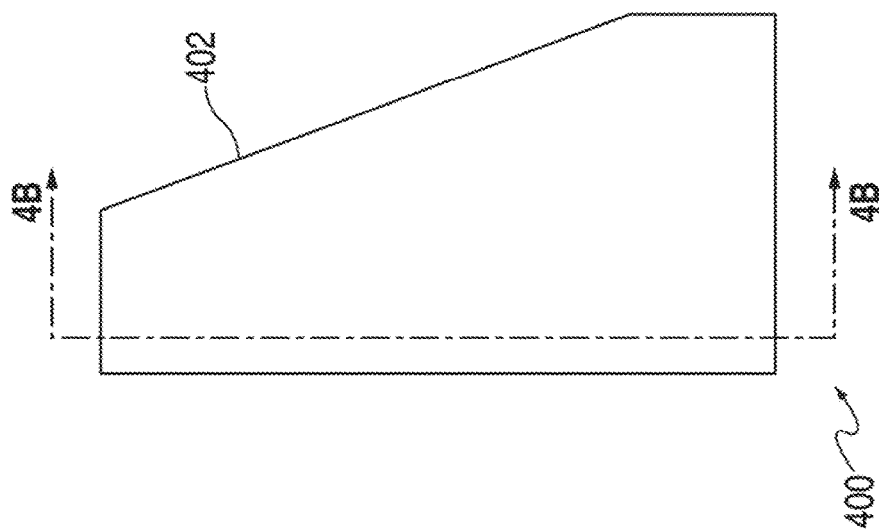
FIG. 4A is a side view of a voice activated electronic device in accordance with various embodiments.

FIG. 4A is a side view of voice activated electronic device 400 in accordance with various embodiments. Voice activated electronic device 400 may be similar to voice activated electronic devices 100 and 300, the same descriptions apply. Voice activated electronic device 400, in some embodiments, may include housing 402. In some embodiments, housing 402 may be similar to housing 302 and housing 102, the same descriptions apply.

FIG. 4B is a cross-sectional view of FIG. 4A in accordance with various embodiments. In some embodiments, housing 402 may include, speaker 404A, speaker 404B, microphone 406A, microphone 406B, microphone 406C, microphone 406D, microphone 406E, microphone 406F, button 408A, button 408B, button 408C and planar board 410. Planar board 410 may be substantially similar to microphone PCB 306 of FIG. 3 and the same description applies.

In some embodiments, speaker 404A and speaker 404B may be similar to speakers 304 and the same description applies. Speaker 404A and speaker 404B can be any electrical devices capable of converting electrical signals into vibrations of air. These vibrations in some embodiments, are output into housing 402 which amplifies the vibrations. In some embodiments, speakers 304 is a passive speaker. In another embodiments, speakers 304 is a powered speaker (i.e. an active speaker). In another embodiment, speakers 304 includes more than one speaker. Multiple speakers, in some embodiments, may output sound in either a stereophonic (i.e. stereo) method or monophonic (i.e. mono) method. Furthermore, in some embodiments, the multiple speakers may output sound in tandem. In some embodiments, a vibration mitigator may surround speakers 304. The vibration mitigator may be any material that will dampen excess vibration caused by the operation of voice activated electronic device 100. In some embodiments, the vibration mitigator may be made of foam.

In some embodiments, button 408A, button 408B and button 408C may be similar to button 110A, button 110B, and button 110C and the same description applies. Button 408A, button 408B, and button 408C may refer to any material that, when pressed by a user, may cause voice activated electronic device 400 to perform a function. For example, button 408A may refer to a mute button. A mute button, in some embodiments, may cause the microphones to stop recording or listening. Button 408B may be a button that increases the volume. Button 408C may be a button to decrease the volume. In some embodiments, button 408A, button 408B and button 408C may be electrically coupled to planar board 410. For example, if button 408C is pressed, a circuit on planar board 410 is closed causing speaker 404A and speaker 404B to decrease the volume of sound output. In some embodiments, button 408A, button 408B, and button 408C may be mechanically coupled to housing 402.

In some embodiments, microphone 406A, microphone 406B, microphone 406C, microphone 406D, microphone 406E, and microphone 406F (hereinafter "array of microphones 406") may be similar to the description of microphones of microphone PCB 306 and the same description applies. In some embodiments, array of microphones 406 may be positioned in a planar array. For example, array of microphones 406 may be arranged in a single row in a single plane, e.g., a liner array. As another example, array of microphones 406 may be arranged in more than one row in a single plane. In some embodiments, array of microphones 406 may be positioned in a linear array. For example, array of microphones 406 may be positioned in one row. In some embodiments, array of microphones 406 are omnidirectional microphones. In some embodiments, array of microphones 406 are directional microphone. In one, non-limiting, exemplary embodiment, array of microphones 406 are located a sufficient distance away from speaker 404A and speaker 404B in housing 402, such that input audio is capable of being received by array of microphones 406 when speaker 404A and speaker 404B are playing output audio. For example, if speaker 404A and speaker 404B are outputting the weather forecast, array of microphones 406 may still be able to detect a wakeword being spoken by a user.

In some embodiments, microphone array 406 may be electrically and mechanically coupled to planar board 410. Furthermore, in some embodiments, a vibration mitigator may be mechanically coupled to array of microphones 408. A vibration mitigator may refer to a material that may dampen vibrations caused by the operation of housing 302 and speakers 304. The vibration mitigator may be made from foam.

Planar board 410, in some embodiments, may refer to a printed circuit board. A printed circuit board, may contain, and/or facilitate communication with, central processing units and memory. In some embodiments, planar board 410 may be mechanically and electrically coupled to array of microphones 406. In some embodiments planar board 410 may be electrically coupled to button 408A, button 408B and button 408C. In some embodiments, planar board 410 may be mechanically coupled to housing 402. In another embodiment, planar board 410 may be electrically coupled to another printed circuit board or logic board.

Figure 5:
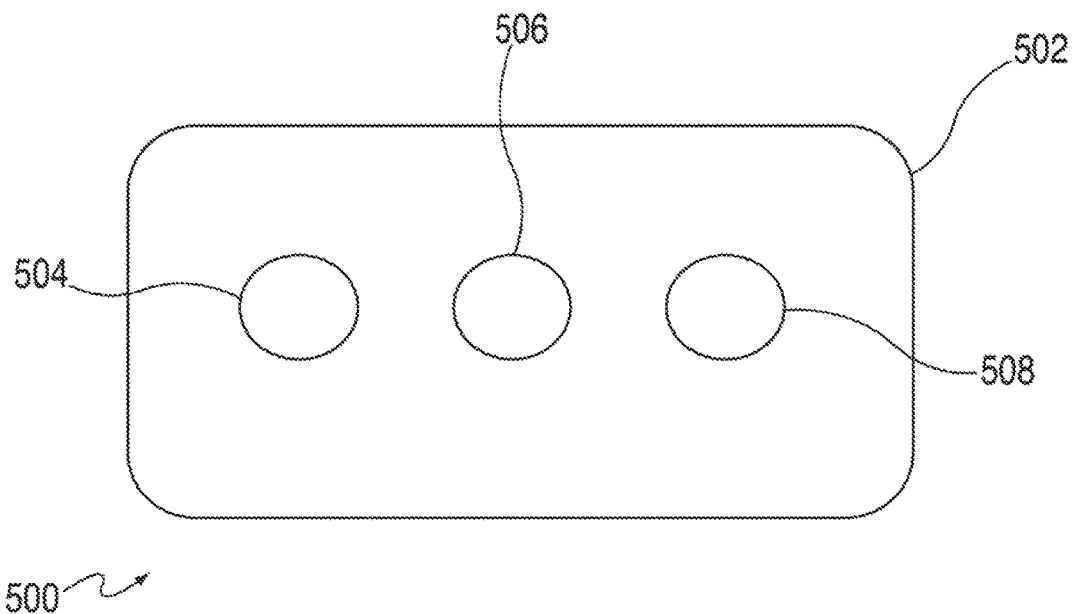
FIG. 5 is a top view of a voice activated electronic device in accordance with various embodiments.

FIG. 5 is a top view of a voice activated electronic device in accordance with various embodiments. Top view 502, in some embodiments, may illustrative a top perspective view of voice activated electronic device 100, 300, and 400, as described above. For instance, top view 500 may illustrate a top portion of housing 502, button 504, button 506, and button 508. In some embodiments, housing 502 may be similar to housing 302 and housing 102, the same descriptions apply.

In some embodiments, button 504, button 506 and button 508 may be similar to button 408A, button 408B, and button 408C and the same description applies. Button 504, button 506, and button 508 may refer to any material that, when pressed by a user, may cause voice activated electronic device 500 to perform a function. Button 504, button 506 and button 508 may be made from substantially similar material to housing 102. In one embodiment, button 504 may refer to a mute button. Button 506 may be a button that increases the volume of voice activated electronic device 100, 300, 400. Button 508 may be a button to decrease the volume of voice activated electronic device 100, 300, 400. In some embodiments, button 504, button 506 and button 508 may be electrically coupled to a printed circuit board. For example, if button 504 is pressed, a circuit on the printed circuit board is closed causing an array of microphones of voice activated electronic device 100, 300, 400 to stop recording audio. In some embodiments, button 504, button 506, and button 508 may be mechanically coupled to housing 502. Persons of ordinary skill recognize that any number of buttons may be used to accommodate any number of functions that are wanted or needed.

Figure 6A:
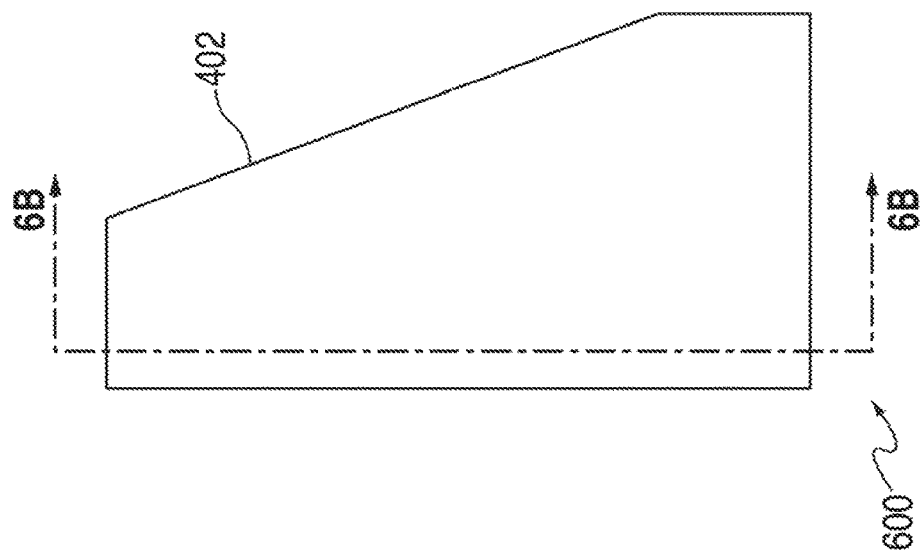
FIG. 6A is a side view of a voice activated electronic device in accordance with various embodiments.
Figure 6C:
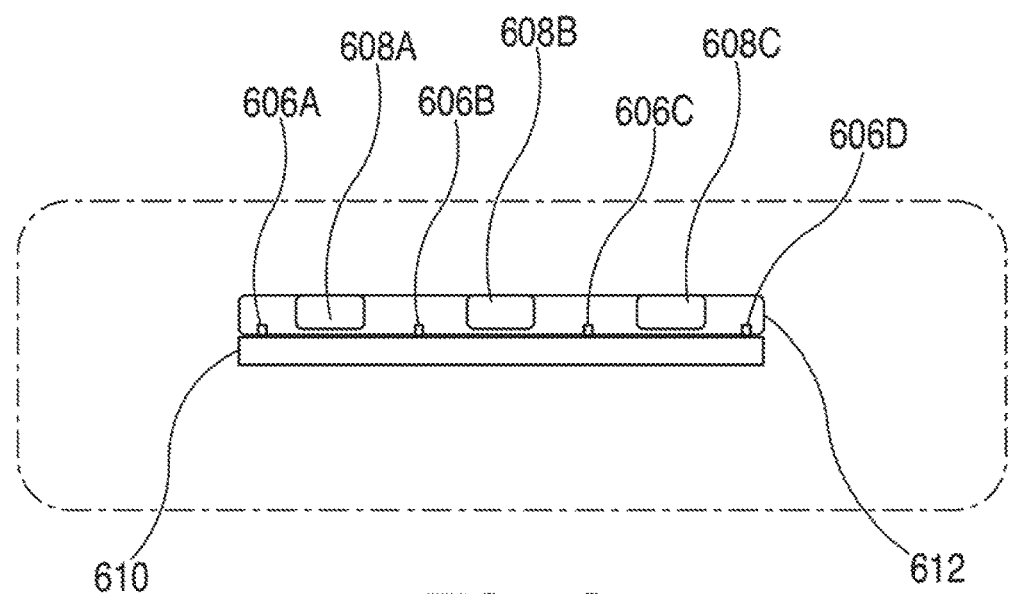
FIG. 6C is a blown up view of a portion of FIG. 6B in accordance with various embodiments.

FIG. 6A is a side view of a voice activated electronic device in accordance with various embodiments. Voice activated electronic device 600 may be similar to voice activated electronic device 100 and the same description applies. Voice activated electronic device 600, in some embodiments, may include housing 602. In some embodiments, housing 602 may be similar to housing 302 and the same description applies.

FIG. 6B is a cross-sectional view of FIG. 6A in accordance with various embodiments. In some embodiments, housing 602 may include, speaker 604A, speaker 604B, and gusset 612. In some embodiments, housing 502 may be similar to housing 302 and housing 102, the same descriptions apply. In some embodiments, speaker 604A and speaker 604B may be similar to speakers 304 and speakers 404A and 404B, the same descriptions apply.

Gusset 612, in some embodiments, may be used to support the use of a pressure adhesive to mechanically couple a touch screen to housing 602. In some embodiments, housing 602 may include gusset 612 in order to accommodate the pressure required by the pressure adhesive to mechanically couple a touch panel to housing 602. Gusset 612 provides support to enable the required pressure on a touch panel. The gusset may be made of any material suitable for stabilizing housing 602 during the installation of a touch panel. A touch panel, as described herein, may be similar to touch panel 312 and the same description applies. In some embodiments, gusset 612 may include multiple structures in order to provide support.

FIG. 6C is a blown up view of a portion of FIG. 6B in accordance with various embodiments. Housing 602 includes microphone 606A, microphone 606B, microphone 606C, microphone 606D (hereinafter "array of microphones 606), button 608A, button 608B, button 608C, planar board 610 and vibration mitigator 612. Planar board 610 may be substantially similar to microphone PCB 306 of FIG. 3 and the same description applies. Planar board 610 may be substantially similar to planar board 410 of FIG. 4 and the same description applies.

In some embodiments, array of microphones 606 may be similar to array of microphones 406 and the same description applies. In some embodiments, button 608A, button 608B and button 608C may be similar to button 110A, button 110B, and button 110C and the same description applies. Planar board 610 may be similar to planar board 410 and the same description applies. In some embodiments, array of microphones 606 may be mechanically coupled and electrically coupled to planar board 610. In some embodiments button 608A, button 608B, and button 608C may be electrically coupled to planar board 610.

Vibration mitigator 612 may be any material suitable for dampening vibration that might affect the performance array of microphones 606. In some embodiments, vibration mitigator 612 allows array of microphones 606 to perform their function while one or more speakers are outputting audio. In some embodiments, vibration mitigator 612 is made of foam. In some embodiments, vibration mitigator 612 is mechanically coupled to array of microphones 606. In some embodiments, vibration mitigator 612 is mechanically coupled to planar board 610.

Figure 7:
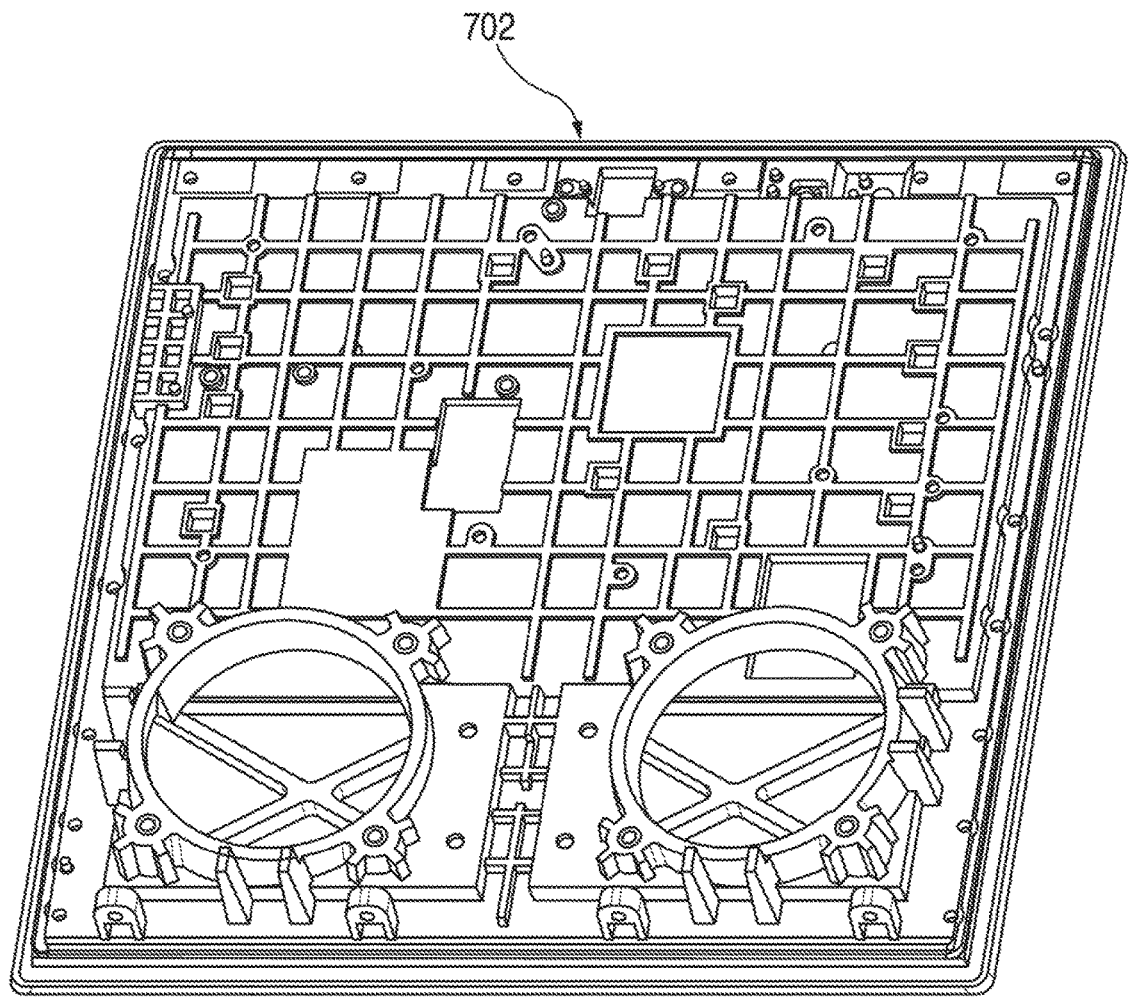
FIG. 7 is an illustrative schematic of a frame of a voice activated electronic device in accordance with various embodiments.

FIG. 7 is an illustrative schematic of frame 702 of a voice activated electronic device in accordance with various embodiments. Frame 702 may be substantially similar to frame 316 of FIG. 3 and the same description applies. In some embodiments, frame 702 may be made of a non-electrically conductive material. Some examples of non-conductive materials may include high-density polyethylene, polyvinyl chloride, polyethylene terephthalate, and rubber. Persons of ordinary skill recognize that this is not an exhaustive list of suitable non-conductive materials and that this list is merely exemplary.

Figure 8:
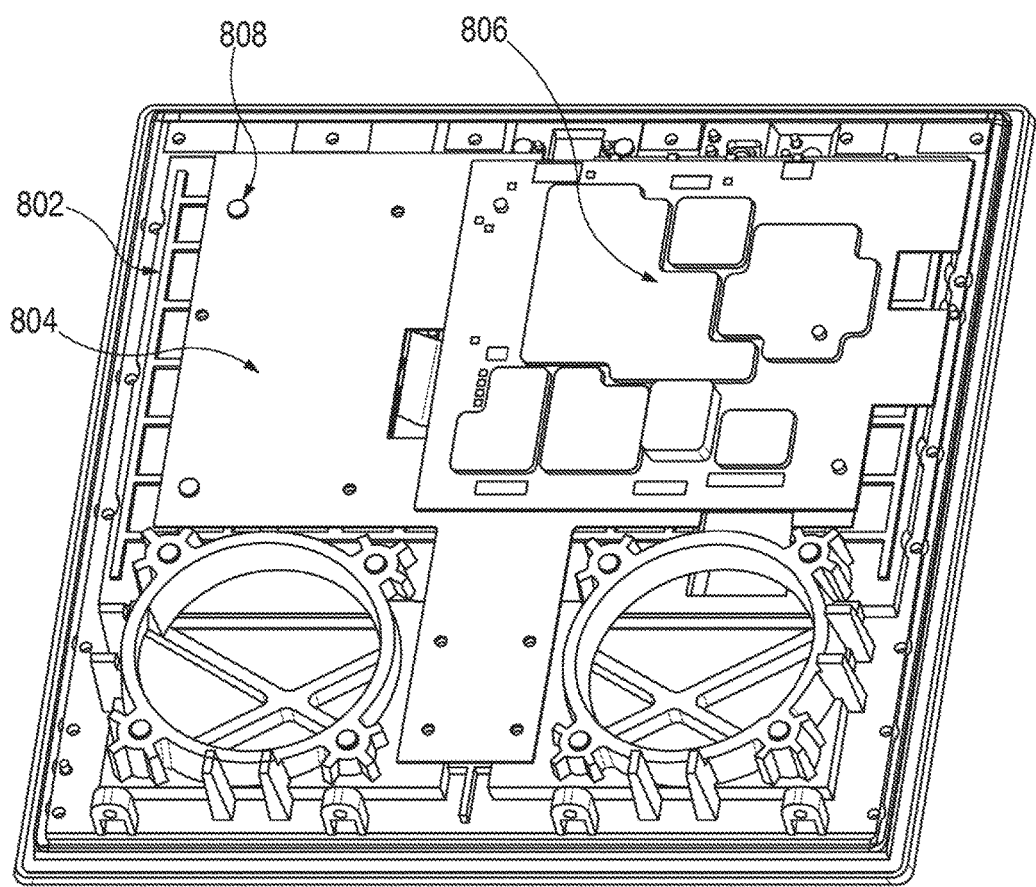
FIG. 8 is an illustrative schematic of a frame of a voice activated electronic device in accordance with various embodiments.

FIG. 8 is an illustrative schematic of frame 802 of a voice activated electronic device in accordance with various embodiments. Frame 802 may be substantially similar to frame 316 of FIG. 3 and the same description applies. Frame 802 may be substantially similar to frame 702 of FIG. 7 and the same description applies. As shown in FIG. 8, frame 802 may be mechanically coupled to thermal plate 804. Thermal plate 804 may be substantially similar to front thermal plate 318A of FIG. 3 and the same description applies. Thermal plate 804 may be mechanically coupled to frame 802 using screws 808. In some embodiments, screws 808 may be installed with a fastening material. The fastening material may, in some embodiments, be made of Nylock. The fastening material, in some embodiments, maintains the structural integrity of screws 808. Furthermore, the fastening material, in some embodiments, may prevent vibrations caused by a voice activated electronic device from effecting the performance of screws 808. Furthermore, frame 802 may be mechanically coupled top logic board 806. Logic board 806 may be substantially similar to logic board 320 of FIG. 3 and the same description applies. Logic board 806 may be mechanically coupled to frame 802 using screws. In some embodiments, screws may be installed with a fastening material. The fastening material may, in some embodiments, be made of Nylock. The fastening material, in some embodiments, maintains the structural integrity of the screws. Furthermore, the fastening material, in some embodiments, may prevent vibrations caused by a voice activated electronic device from effecting the performance of the screws.

Figure 9:
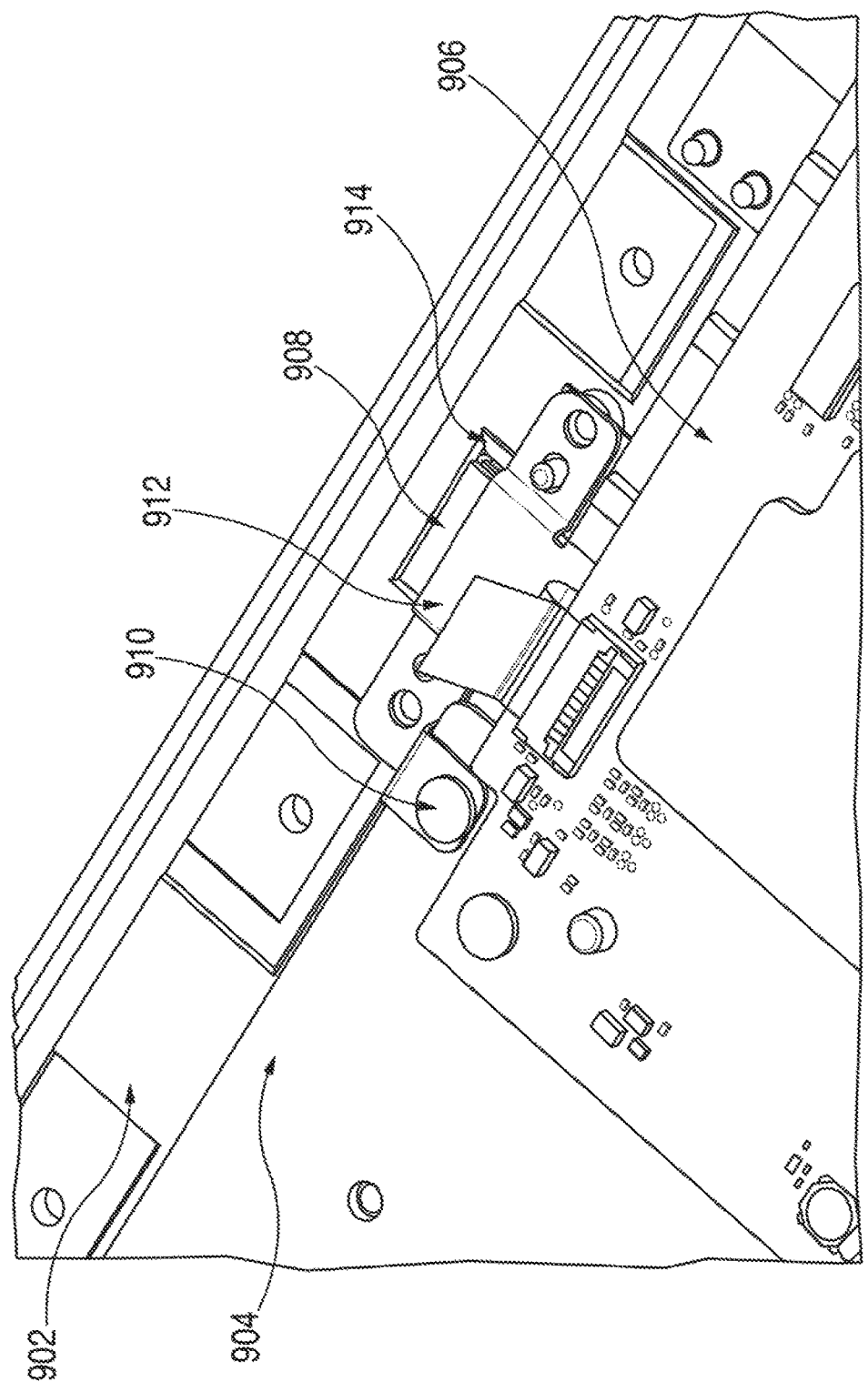
FIG. 9 is an illustrative schematic of a portion of a frame of a voice activated electronic device in accordance with various embodiments.

FIG. 9 is an illustrative schematic of a portion of frame 902 of a voice activated electronic device in accordance with various embodiments. Frame 902 may be substantially similar to frame 316 of FIG. 3 and the same description applies. Frame 902 may be substantially similar to frame 702 of FIG. 7 and the same description applies. Frame 902 may be substantially similar to frame 802 of FIG. 8 and the same description applies. Frame 902 may be mechanically coupled to thermal plate 904 using screw 910. Thermal plate 904 may be substantially similar to front thermal plate 318A of FIG. 3 and the same description applies. Thermal plate 904 may be substantially similar to thermal plate 804 of FIG. 8 and the same description applies. Thermal plate 904 may be mechanically coupled to frame 902 using screws. In some embodiments, screws may be installed with a fastening material. The fastening material may, in some embodiments, be made of Nylock. The fastening material, in some embodiments, maintains the structural integrity of the screws. Furthermore, the fastening material, in some embodiments, may prevent vibrations caused by a voice activated electronic device from effecting the performance of the screws.

Additionally, frame 902 may be mechanically coupled top logic board 906. Logic board 906 may be substantially similar to logic board 320 of FIG. 3 and the same description applies. Logic board 906 may be substantially similar to logic board 806 of FIG. 8 and the same description applies. Logic board 906 may be mechanically coupled to frame 902 using screws. In some embodiments, screws may be installed with a fastening material. The fastening material may, in some embodiments, be made of Nylock. The fastening material, in some embodiments, maintains the structural integrity of the screws. Furthermore, the fastening material, in some embodiments, may prevent vibrations caused by a voice activated electronic device from effecting the performance of the screws.

Frame 902 may also be mechanically coupled to camera 908 Camera 908 may be similar to camera 308 of FIG. 3 and the same description applies. Camera 908, in some embodiments, may also be mechanically coupled plate 912. As shown in FIG. 9, plate 912 is mechanically coupled to frame 902. Plate 912 may be mechanically coupled to frame 902 using screws. Additionally, camera 908 may be mechanically coupled to carrier 914. Carrier 914 may also be mechanically coupled to frame 902. In some embodiments, screw 910 may be installed with a fastening material. The fastening material may, in some embodiments, be made of Nylock. The fastening material, in some embodiments, maintains the structural integrity of the screws. Furthermore, the fastening material, in some embodiments, may prevent vibrations caused by a voice activated electronic device from effecting the performance of the screws. Furthermore, the plate is also mechanically coupled to thermal plate 904. As shown in FIG. 9, camera 908 may also be electrically coupled to logic board 906.

Figure 10:
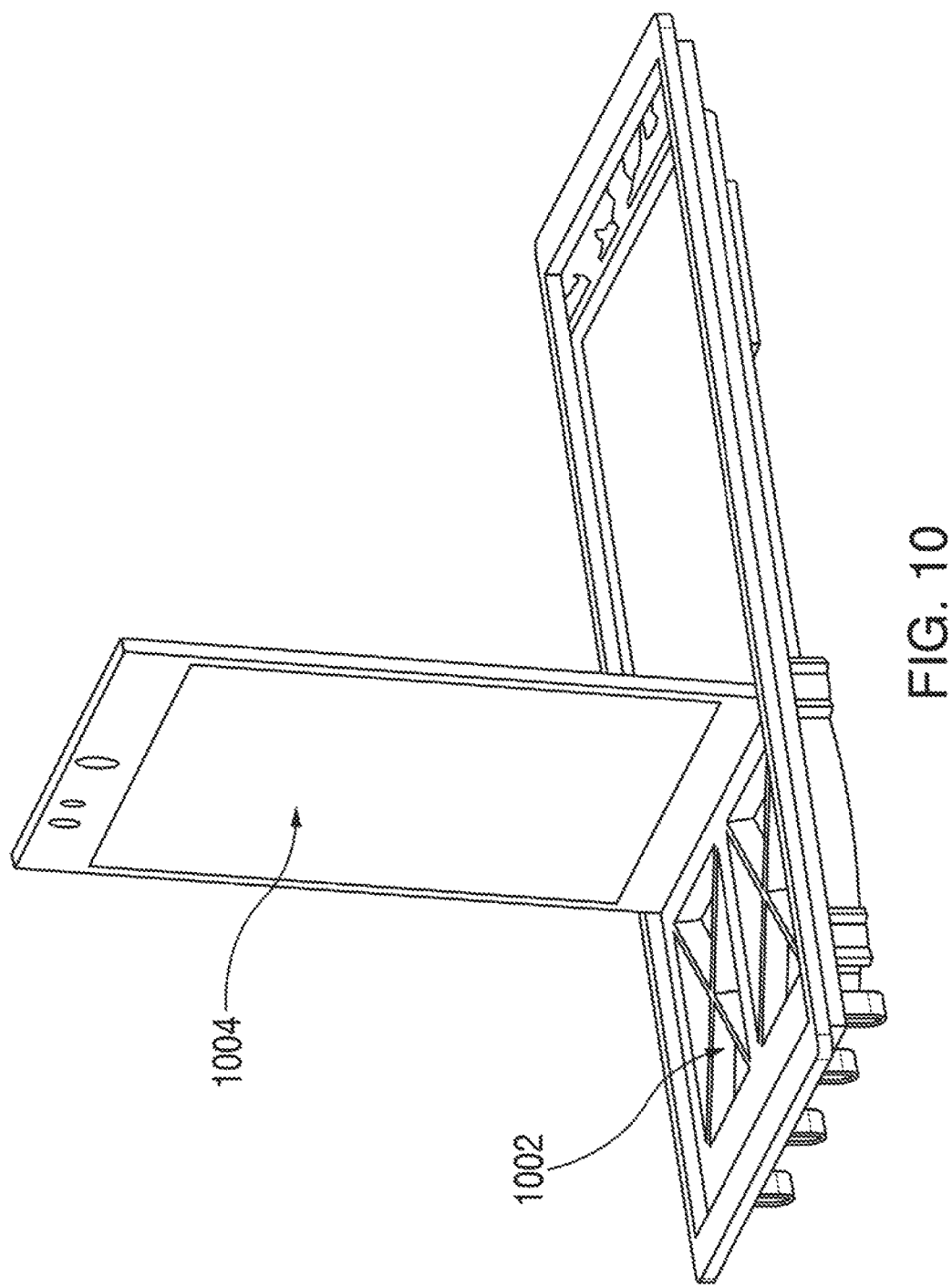
FIG. 10 is an illustrative schematic of a frame of a voice activated electronic device in accordance with various embodiments.

FIG. 10 is an illustrative schematic of frame 1002 of a voice activated electronic device in accordance with various embodiments. Frame 1002 may be substantially similar to frame 316 of FIG. 3 and the same description applies. Frame 1002 may be substantially similar to frame 702 of FIG. 7 and the same description applies. Frame 1002 may be substantially similar to frame 802 of FIG. 8 and the same description applies. Frame 1002 may be substantially similar to frame 902 of FIG. 9 and the same description applies. Frame 1002, as shown in FIG. 10, has a display screen fitting into frame 1002. In some embodiments, the display screen fits into a portion frame 1002. In order to facilitate the display screen fitting into frame 1002, frame 1002 can have a recessed portion. The size of the recessed portion of frame 1002, in some embodiments, may be the same height, length, and depth of the display screen. FIG. 10 shows touch panel 1004 being mechanically coupled to frame 1002. Touch panel 1004 may be substantially similar to touch panel 312 of FIG. 3 and the same description applies.

Figure 11:
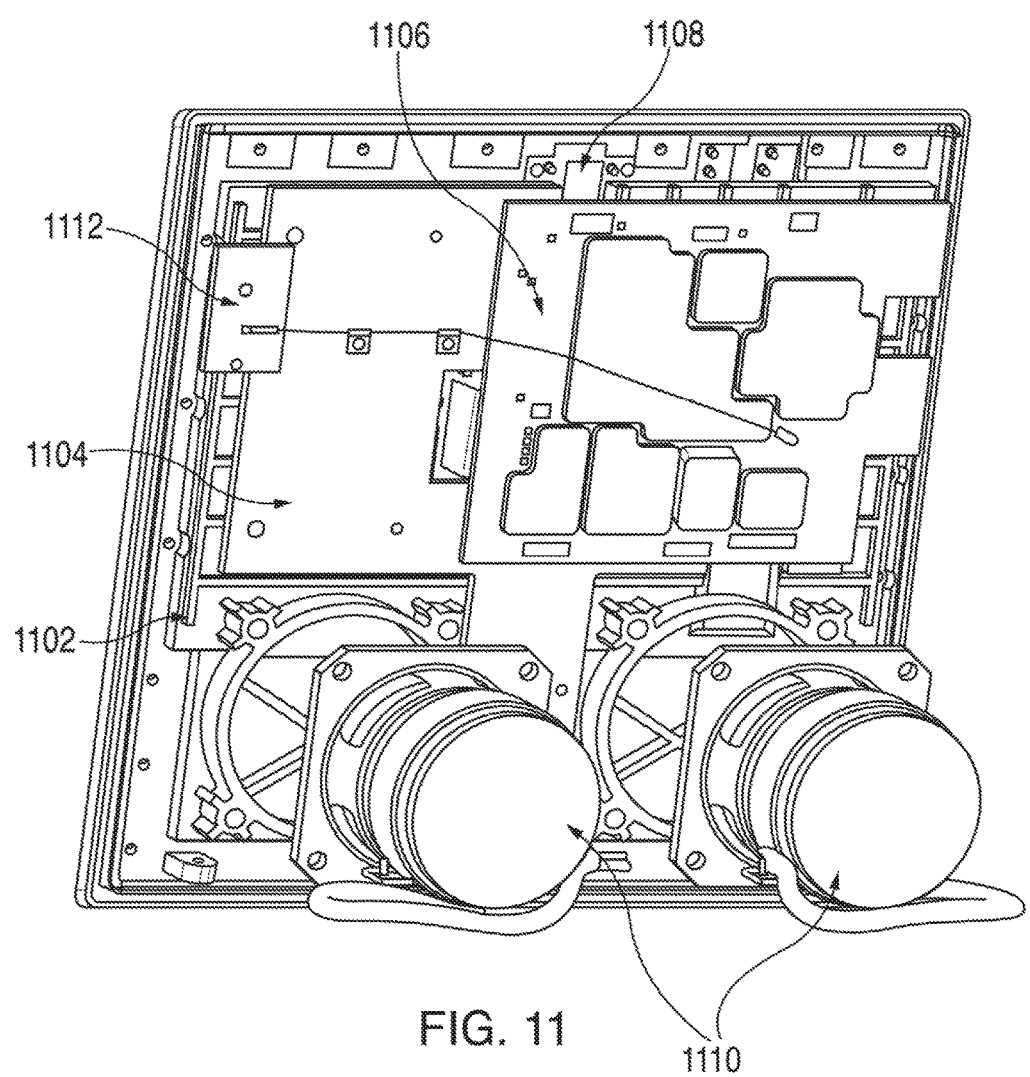
FIG. 11 is an illustrative schematic of a frame of a voice activated electronic device in accordance with various embodiments.

FIG. 11 is an illustrative schematic of frame 1102 of a voice activated electronic device in accordance with various embodiments. Frame 1102 may be substantially similar to frame 316 of FIG. 3 and the same description applies. Frame 1102 may be substantially similar to frame 702 of FIG. 7 and the same description applies. Frame 1102 may be substantially similar to frame 802 of FIG. 8 and the same description applies. Frame 1102 may be substantially similar to frame 902 of FIG. 9 and the same description applies. Frame 1102 may be substantially similar to frame 1002 of FIG. 10 and the same description applies. Frame 1102 may be mechanically coupled to thermal plate 904. Thermal plate 904 may be substantially similar to front thermal plate 318A of FIG. 3 and the same description applies. Thermal plate 1104 may be substantially similar to thermal plate 804 of FIG. 8 and the same description applies. Thermal plate 1104 may be substantially similar to thermal plate 904 of FIG. 9 and the same description applies. Thermal plate 1104 may be mechanically coupled to frame 1102 using screws. In some embodiments, screws may be installed with a fastening material. The fastening material may, in some embodiments, be made of Nylock. The fastening material, in some embodiments, maintains the structural integrity of the screws. Furthermore, the fastening material, in some embodiments, may prevent vibrations caused by a voice activated electronic device from effecting the performance of the screws.

Additionally, frame 1102 may be mechanically coupled top logic board 1106. Logic board 1106 may be substantially similar to logic board 320 of FIG. 3 and the same description applies. Logic board 1106 may be substantially similar to logic board 806 of FIG. 8 and the same description applies. Logic board 1106 may be substantially similar to logic board 906 of FIG. 9 and the same description applies. Logic board 1106 may be mechanically coupled to frame 1102 using screws. In some embodiments, screws may be installed with a fastening material. The fastening material may, in some embodiments, be made of Nylock. The fastening material, in some embodiments, maintains the structural integrity of the screws. Furthermore, the fastening material, in some embodiments, may prevent vibrations caused by a voice activated electronic device from effecting the performance of the screws.

In some embodiments, frame 1102 may be mechanically coupled to camera 1108. Camera 1108 may be similar to camera 308 of FIG. 3 and the same description applies. Camera 1108 may be similar to camera 908 of FIG. 9 and the same description applies. Camera 1108 may be mechanically coupled to frame 1102. Camera 1108 may be mechanically coupled to thermal plate 1104. In some embodiments, camera 1108 may be electrically coupled to logic board 1106.

In some embodiments, frame 1102 may be mechanically coupled to speakers 1110. Speakers 1110 may be substantially similar to speakers 304 of FIG. 3 and the same description applies. Speakers 1110 can be any electrical device capable of creating output sound. In some embodiments, speakers 1110 are passive speakers. In another embodiments, speakers 1110 are powered speakers (i.e. an active speaker). Speakers 1110, in some embodiments, may output sound in either a stereophonic (i.e. stereo) method or monophonic (i.e. mono) method. Furthermore, in some embodiments, the speakers 1110 may output sound in tandem. In some embodiments, speakers 1110 are electrically coupled to logic board 1106. In some embodiments, a vibration mitigator may surround speakers 1110. The vibration mitigator may be any material that will dampen excess vibration caused by the operation of a voice activated electronic device. In some embodiments, the vibration mitigator may be made of foam. In some embodiments, speakers 1110 may have speaker grill and felt.

In some embodiments, frame 1102 may be mechanically coupled to BT antenna 1112. BT antenna 1112 may be substantially similar to BT antenna 330 of FIG. 3 and the same description applies. In some embodiments, BT antenna 1112 may be electrically coupled to logic board 320.

Figure 12:
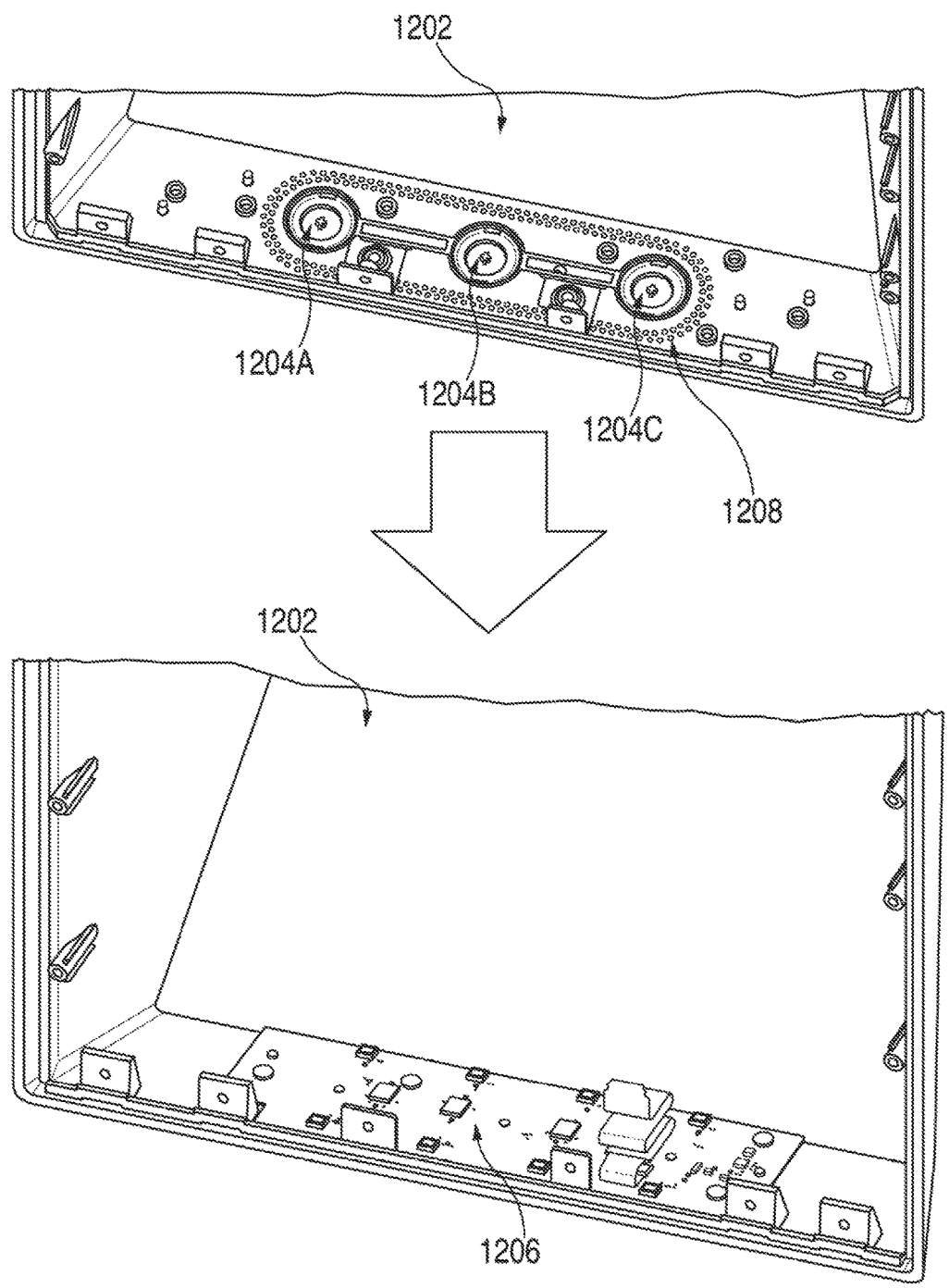
FIG. 12 is an illustrative schematic of a portion of a housing in accordance with various embodiments.

FIG. 12 is an illustrative schematic of a portion of housing 1202 in accordance with various embodiments. FIG. 12 is a view of housing 1202 upside down. FIG. 12 shows the top portion of housing 1202 before planar board 1206 is mechanically coupled to housing 1202 (diagram on the top) and after planar board 1206 is mechanically coupled to housing 1202 (diagram on the bottom). Housing 1202 may be substantially similar to housing 102 of FIG. 1 and the same description applies. Housing 1202 may be substantially similar to housing 302 of FIG. 3 and the same description applies. Housing 1202 may be substantially similar to housing 402 of FIGS. 4A and 4B and the same description applies. Housing 1202 may be substantially similar to housing 502 of FIG. 5 and the same description applies. Housing 1202 may be substantially similar to housing 602 of FIGS. 6A and 6B and the same description applies.

Housing 1202 may comprise button 1204A, button 1204B, and button 1204C (hereinafter "buttons 1204"). Buttons 1204 may be substantially similar to button 110A, button 110B, and button 110C of FIG. 1 and the same description applies. Buttons 1204 may be substantially similar to button 408A, button 408B and button 408C of FIG. 4 and the same description applies. Buttons 1204 may be substantially similar to button 504, button 506, and button 508 of FIG. 5 and the same description applies. Buttons 1204 may be substantially similar to button 606A, button 606B, and button 606C of FIGS. 6B and 6C and the same description applies. Buttons 1204 may refer to any material that, when pressed by a user, an electrical device to perform a function. For example, button 1204A may refer to a mute button. A mute button, in some embodiments, may cause the microphones to stop recording or listening. Button 1204B may be a button that increases the volume. Button 1204C may be a button to decrease the volume. For example, if button 1204B is pressed, a circuit may closed on planar board 1206 causing a speaker to increase the volume of sound output. In some embodiments, buttons 1204, may be mechanically coupled to housing 1202 and electrically coupled to planar board 1206. In some embodiments, housing 1202, may include holes 1208. Holes 1208 may be holes in the top portion of housing 1202. In some embodiments, holes 1208 may be positioned to receive microphones on planar board 1206.

In some embodiments, housing 1202 may be mechanically coupled to planar board 1206. Planar board 1206 may be substantially similar to microphone PCB 306 of FIG. 3 and the same description applies. Planar board 1206 may be substantially similar to planar board 410 of FIG. 4B and the same description applies. Planar board 1206 may be substantially similar to planar board 610 of FIG. 6C and the same description applies. Planar board 1206 in some embodiments, may refer to a printed circuit board. A printed circuit board, may contain, and/or facilitate communication with, central processing units and memory. In some embodiments, planar board 1206 may be mechanically and electrically coupled to one or more microphones. In some embodiments, the one or more microphones may be an array of microphones (as shown in FIGS. 4B, 6B, and 6C).

FIG. 13A is an illustrative schematic of a side view of voice activated electronic 1300 device in accordance with various embodiments. FIG. 13 shows the side of voice activated electronic device 1300 before frame 1304 is mechanically coupled to frame 1302 (diagram on the left) and voice activated electronic device 1300 as frame 1304 is being mechanically coupled to housing 1302 (diagram on the right). Housing 1302 may be substantially similar to housing 102 of FIG. 1 and the same description applies. Housing 1302 may be substantially similar to housing 302 of FIG. 3 and the same description applies. Housing 1302 may be substantially similar to housing 402 of FIGS. 4A and 4B and the same description applies. Housing 1302 may be substantially similar to housing 502 of FIG. 5 and the same description applies. Housing 1302 may be substantially similar to housing 602 of FIGS. 6A and 6B and the same description applies. Housing 1302 may be substantially similar to housing 1202 of FIG. 12 and the same description applies. In some embodiments, a front opening of housing 1302 may be a similar in size to frame 1304. The similarity in size may facilitate mechanically coupling frame 1304 to housing 1302. Furthermore, in some embodiments, a similarity in size may contribute to housing 1302 being air tight.

Voice activated electronic device 1300 may comprise frame 1304. Frame 1304 may be substantially similar to frame 316 of FIG. 3 and the same description applies. Frame 1304 may be substantially similar to frame 702 of FIG. 7 and the same description applies. Frame 1304 may be substantially similar to frame 802 of FIG. 8 and the same description applies. Frame 1304 may be substantially similar to frame 902 of FIG. 9 and the same description applies. Frame 1304 may be substantially similar to frame 1002 of FIG. 10 and the same description applies. Frame 1304 may be substantially similar to frame 1102 of FIG. 11 and the same description applies. As shown in FIG. 13, frame 1304 may be mechanically coupled to speaker 1306. Speakers 1306 may be substantially similar to speakers 304 of FIG. 3 and the same description applies. Speakers 1306 may be substantially similar to speakers 1110 of FIG. 11 and the same description applies.

Figure 13B:
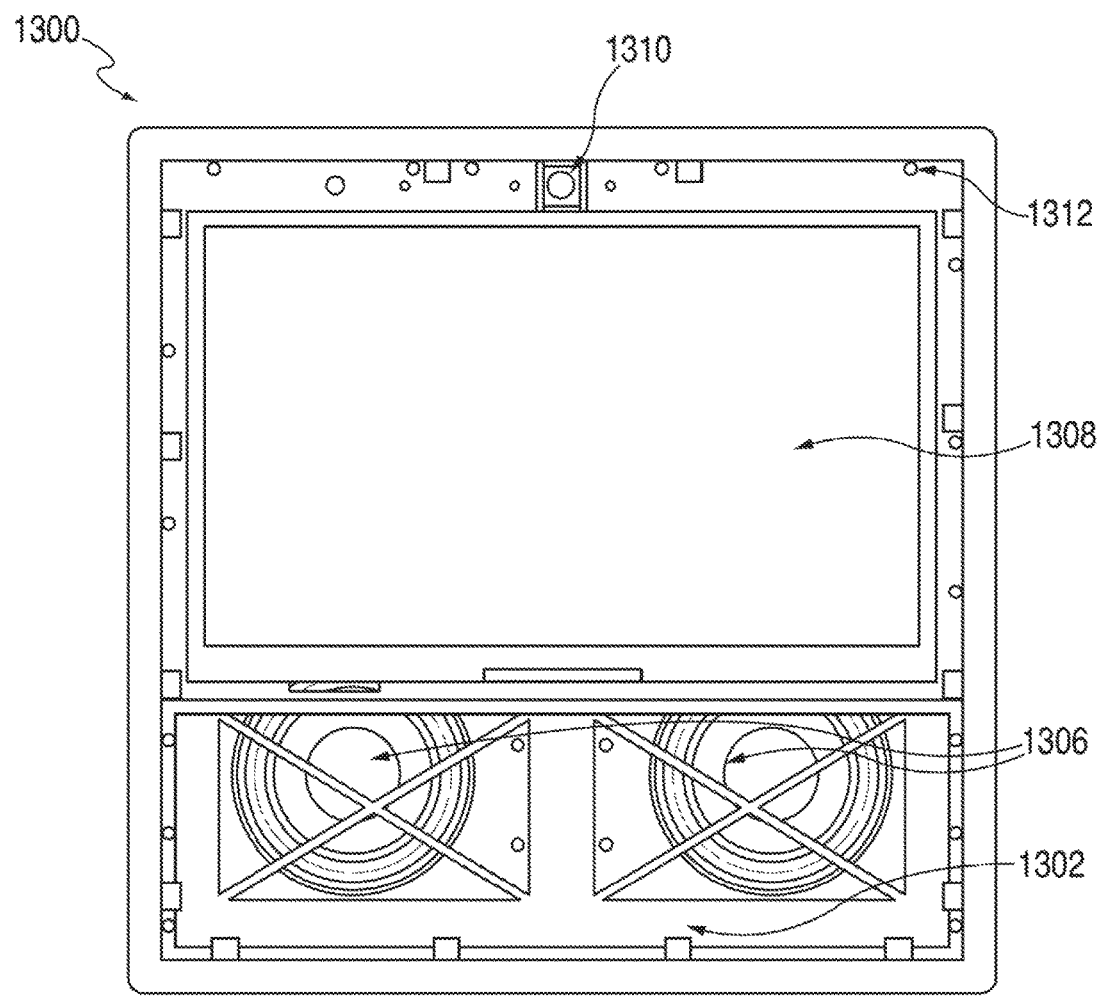
FIG. 13B is an illustrative schematic of a front view of a voice activated electronic device in accordance with various embodiments.

FIG. 13B is an illustrative schematic of a front view of voice activated electronic device 1300 in accordance with various embodiments. FIG. 13B shows frame 1304 mechanically coupled to housing 1302 (not seen in front view). Frame 1304, in some embodiments, may have openings 1312 where screws are inserted to mechanically couple frame 1304 to housing 1302. In some embodiments, screws may be installed with a fastening material. The fastening material may, in some embodiments, be made of Nylock. The fastening material, in some embodiments, maintains the screw's structural integrity. Furthermore, the fastening material, in some embodiments, may prevent vibrations caused by voice activated electronic device 1300 from effecting the performance of the screw. In some embodiments, display screen 1308 may be mechanically coupled to frame 1304 using adhesives.

In some embodiments, frame 1304 may be mechanically coupled to display screen 1308. Display screen 1308 may be substantially similar to display screen 310 of FIG. 3 and the same description applies. Display screen 1308 may be substantially similar to display screen 1004 of FIG. 10 and the same description applies. In some embodiments, frame 1304 may be mechanically coupled to camera 1310. Camera 1310 may be similar to camera 308 of FIG. 3 and the same description applies. Camera 1310 may be similar to camera 908 of FIG. 9 and the same description applies. Camera 1310 may be similar to camera 1108 of FIG. 11 and the same description applies.

Figure 14A:
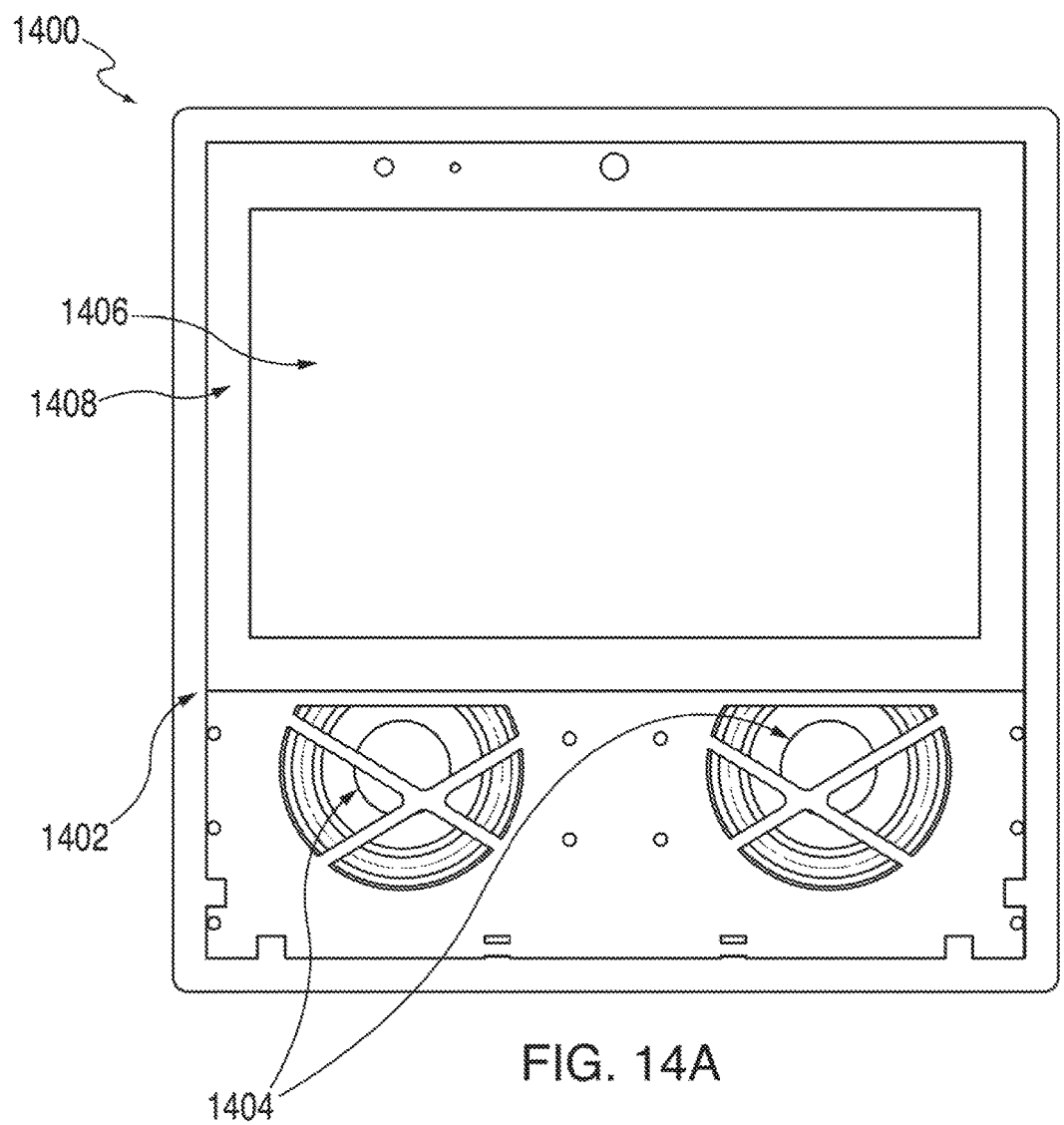
FIG. 14A is an illustrative schematic of a front view of a voice activated electronic device in accordance with various embodiments.
Figure 14B:
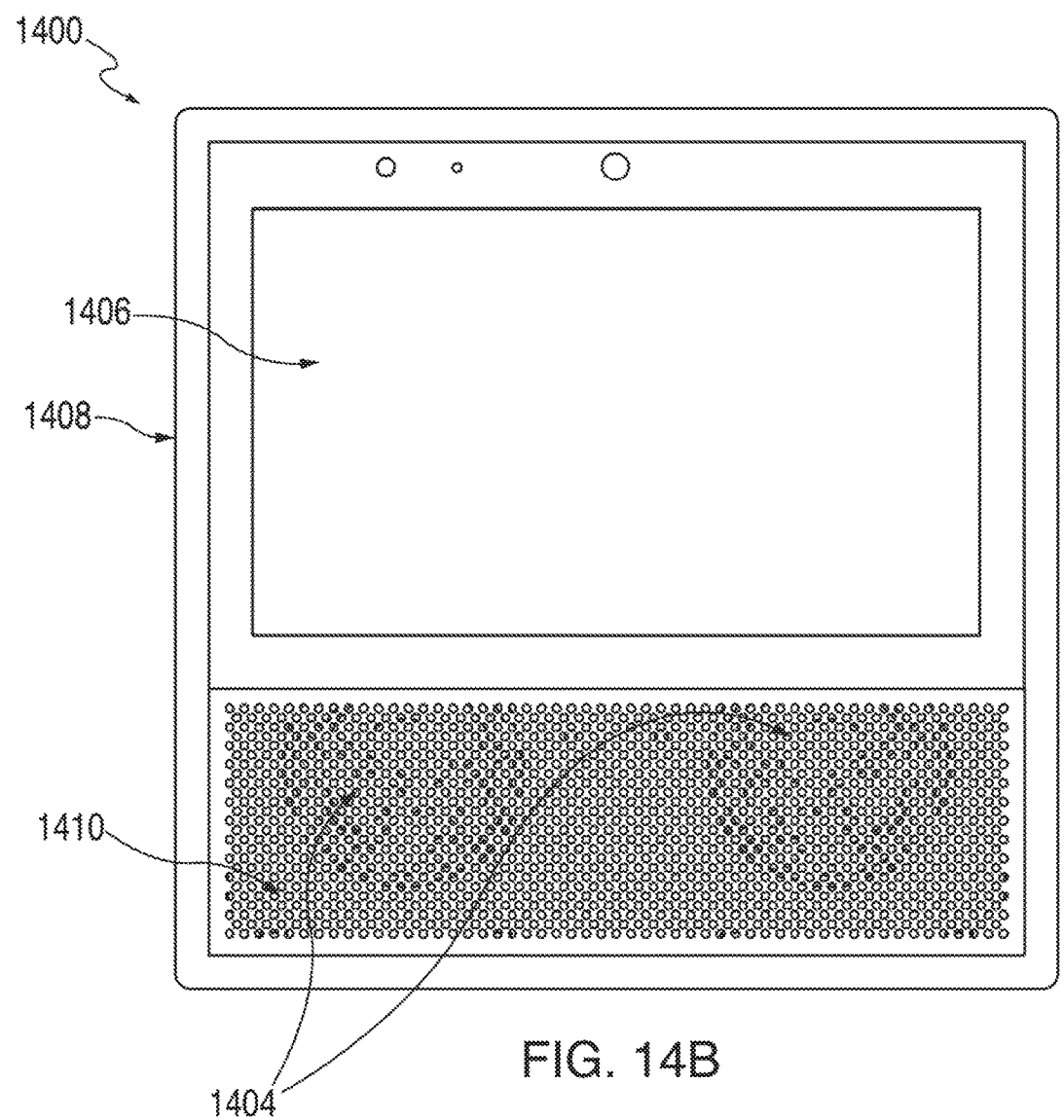
FIG. 14B is an illustrative schematic of a front view of a voice activated electronic device in accordance with various embodiments.

FIG. 14A is an illustrative schematic of a front view of voice activated electronic device 1400 in accordance with various embodiments. FIG. 14 is a front view of voice activated electronic device 1400. Voice activated electronic device 1400 comprises a housing (not shown). The housing is mechanically coupled to frame 1402. Frame 1402 may be substantially similar to frame 316 of FIG. 3 and the same description applies. Frame 1402 may be substantially similar to frame 702 of FIG. 7 and the same description applies. Frame 1402 may be substantially similar to frame 802 of FIG. 8 and the same description applies. Frame 1402 may be substantially similar to frame 902 of FIG. 9 and the same description applies. Frame 1402 may be substantially similar to frame 1002 of FIG. 10 and the same description applies. Frame 1402 may be substantially similar to frame 1102 of FIG. 11 and the same description applies. Frame 1402 may be substantially similar to frame 1304 of FIGS. 13A and 13B and the same description applies.

In some embodiments, frame 1402 may be mechanically coupled to speakers 1404. Speakers 1404 may be substantially similar to speakers 304 of FIG. 3 and the same description applies. Speakers 1404 may be substantially similar to speakers 1110 of FIG. 11 and the same description applies. Speakers 1404 may be substantially similar to speakers 1306 of FIG. 13 and the same description applies. In some embodiments, frame 1402 may be mechanically coupled to display screen 1406. Display screen 1406 may be substantially similar to display screen 310 of FIG. 3 and the same description applies. Display screen 1406 may be substantially similar to display screen 1004 of FIG. 10 and the same description applies. Display screen 1406 may be substantially similar to display screen 1308 of FIG. 13B and the same description applies.

In some embodiments, voice activated electronic device 1400 may comprise touch panel 1408. Touch panel 1408 may be substantially similar to touch panel 312 of FIG. 3 and the same description applies. Touch panel 1408 may be mechanically coupled to frame 1402 using a pressure adhesive. In some embodiments, touch panel 1408 may have a greater length and width than display screen 1406. With a greater height and width, touch panel 1408 may be in direct contact with frame 1402. Direct contact between touch panel 1408 and frame 1402 allows touch panel 1408 to help secure display screen 1406. Furthermore, in some embodiments, where touch panel 1408 overlaps with display screen 1406, touch panel 1408 may be translucent. In some embodiments, where touch panel 1408 is in direct contact with frame 1402, touch panel 1408 may be opaque. The opaque portion of touch panel 1408, in some embodiments, may cover screws and adhesives.

FIG. 14B is an illustrative schematic of a front view of voice activated electronic device 1400 in accordance with various embodiments. FIG. 14B shows voice activated electronic device 1400 with grill 1410 mechanically coupled to frame 1402. Grill 1410, in some embodiments, may be a hard grill mounted directly over speakers 1404 to protect speakers 1404. Grill 1410, in some embodiments, may be a soft grill mounted directly over speakers 1404 to protect speakers 1404. In some embodiments, felt may be placed between grill 1410 and speakers 1404. Felt, as used herein, may be similar to felt 304B of FIG. 3 and the same description applies.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A voice activated electronic device comprising:
   a housing including a back panel, a front panel, a top panel, a bottom panel, and two side panels, the housing defining an internal cavity, wherein the top panel comprises microphone holes;
   a frame mechanically coupled to the housing and forming part of the front panel;
   a first thermal plate mechanically coupled to the frame, wherein the first thermal plate is disposed adjacent to the front panel;
   a second thermal plate mechanically coupled to the housing and thermally coupled to the first thermal plate, wherein the first thermal plate receives heat produced by the voice activated electronic device and communicates the heat to the second thermal plate, wherein the second thermal plate comprises a first portion that is coupled to the first thermal plate, and a second portion that is substantially parallel to the bottom panel and substantially orthogonal to the first portion;
   a first speaker mechanically coupled to the housing, and partially located within the internal cavity;
   an array of microphones comprising at least one vibration mitigator, the array of microphones being mechanically coupled to the top panel of the housing and partially located within the internal cavity; and
   control circuitry that controls the operation of the voice activated electronic device.

2. The voice activated electronic device of claim 1, further comprising:
   a second speaker mechanically coupled to the housing;
   wherein:
     the first speaker does not have an individual sealed speaker box;
     the second speaker does not have an individual speaker box; and
     the first speaker and the second speaker share the internal cavity to assist in the production of sound output by the first speaker and the second speaker.

3. The voice activated electronic device of claim 1, wherein the frame is mechanically coupled to at least the touch sensitive display unit, the first speaker, and the control circuitry.

4. The voice activated electronic device of claim 1, further comprising:
   a gusset mechanically coupled to the frame such that the gusset provides structural support to the touch sensitive display unit.

5. The voice activated electronic device of claim 1, further comprising an antenna mechanically coupled to the frame, wherein the antenna is configured to transmit digital audio data to a remote server device and receive input data from the remote server device.

6. The voice activated electronic device of claim 1, further comprising:
   an image capturing component, mechanically coupled to the housing, partially located within the internal cavity, and aligned with an opening in the housing; and
   a touch sensitive display unit mechanically coupled to a portion of the housing and forming part of the front panel.

7. The voice activated electronic device of claim 6, wherein the image capturing component comprises:
   a camera;
   a carrier mechanically coupled to the camera; and
   a plate mechanically coupled to the housing.

8. The voice activated electronic device of claim 1, wherein the first portion is adjacent to the first thermal plate.

9. A voice activated electronic device, comprising:
a housing including a back panel, a front panel, a top panel, a bottom panel, and two side panels, the housing defining an internal cavity;
a frame mechanically coupled to the housing and forming part of the front panel;
a first thermal plate mechanically coupled to the frame;
a second thermal plate mechanically coupled to the housing and thermally coupled to the first thermal plate, wherein the first thermal plate receives heat produced by the voice activated electronic device and communicates the heat to the second thermal plate, and wherein the second thermal plate comprises a first portion that is coupled to the first thermal plate, and a second portion that is substantially parallel to the bottom panel and substantially orthogonal to the first portion;
a plurality of microphones mechanically coupled to the top panel of the housing and partially located within the internal cavity; and
a touch sensitive display unit mechanically coupled to a portion of the housing and forming part of the front panel.

10. The voice activated electronic device of claim 9, further comprising:
a first speaker mechanically coupled to the housing;
a second speaker mechanically coupled to the housing;
wherein:
the first speaker does not have an individual sealed speaker box;
the second speaker does not have an individual speaker box; and
the first speaker and the second speaker share the cavity to assist in the production of sound output by the first speaker and the second speaker.

11. The voice activated electronic device of claim 10, further comprising:
an image capturing component, mechanically coupled to the housing, partially located within the internal cavity, and aligned with an opening in the housing, wherein the image capturing component is operable to capture image data and send the image data to the control circuitry.

12. The voice activated electronic device of claim 10, further comprising:
an antenna mechanically coupled to the housing, wherein the antenna is capable of wirelessly connecting with an additional electronic device; and
an infrared sensor.

13. The voice activated electronic device of claim 10, further comprising:
a gusset mechanically coupled to the frame such that the gusset provides structural support to the voice touch sensitive display unit;
wherein the frame is mechanically coupled to at least the touch sensitive display unit, the first speaker, the second speaker, and the control circuitry.

14. The voice activated electronic device of claim 9, wherein the plurality of microphones are arranged in two parallel rows in a planar array.

15. A voice activated electronic device, comprising:
a housing including a back panel, a front panel, a top panel, a bottom panel, and two side panels, the housing defining an internal cavity;
an array of microphones partially located within the internal cavity;
a frame, mechanically coupled to the housing and forming a part of the front panel;
a first thermal plate mechanically coupled to the frame;
a second thermal plate mechanically coupled to the housing and thermally coupled to the first thermal plate, wherein the first thermal plate receives heat produced by the voice activated electronic device and communicates the heat to the second thermal plate, and wherein the second thermal plate comprises a first portion that is coupled to the first thermal plate, and a second portion that is substantially parallel to the bottom panel and substantially orthogonal to the first portion;
a gusset, mechanically coupled to the frame and providing structural integrity to the voice activated electronic device; and
control circuitry that controls the operation of the voice activated electronic device.

16. The voice activated electronic device of claim 15, further comprising:
a first speaker mechanically coupled to the frame;
a second speaker mechanically coupled to the frame;
wherein:
the first speaker does not have an individual sealed speaker box;
the second speaker does not have an individual speaker box; and
the first speaker and the second speaker share the internal cavity to assist in the production of sound output by the first speaker and the second speaker.

17. The voice activated electronic device of claim 15, further comprising:
an antenna mechanically coupled to the frame and electrically coupled to the control circuitry.

18. The voice activated electronic device of claim 15, wherein the array of microphones are arranged in a planar array.

19. The voice activated electronic device of claim 15, further comprising:
an antenna mechanically coupled to the housing, wherein the antenna is capable of wirelessly connecting with an additional electronic device; and
an infrared sensor.

20. The voice activated electronic device of claim 15, further comprising:
an image capturing component, mechanically coupled to the frame, partially located within the internal cavity, and aligned with an opening in the frame;
a touch sensitive display unit mechanically coupled to the frame and forming part of the front panel; and
a first speaker mechanically coupled to the frame, and partially located within the internal cavity such that the cavity operates to assist in the production of sound output by the first speaker, wherein the first speaker faces the front panel;
wherein the array of microphones comprises at least one vibration mitigator, the array of microphones being mechanically coupled to the top panel of the housing, wherein the array of microphones are partially exposed such that the array of microphones can receive input audio.

* * * * *